United States Patent [19]
Reese

[11] 3,818,846

[45] June 25, 1974

[54] METHOD AND APPARATUS FOR LIQUID DISPOSAL IN A FLUID BED REACTOR

[75] Inventor: Richard G. Reese, Woodside, Calif.

[73] Assignee: Combustion Power Co. Inc., Menlo Park, Calif.

[22] Filed: Apr. 26, 1972

[21] Appl. No.: 247,829

[52] U.S. Cl. ............. 110/8 R, 34/57 A, 110/8 C
[51] Int. Cl. ........................................ F23g 5/02
[58] Field of Search ............ 110/7 R, 8 R, 8 C, 15, 110/18 R, 18 C; 34/57 R, 57 A

[56] References Cited
UNITED STATES PATENTS

| | | | |
|---|---|---|---|
| 3,066,017 | 11/1962 | Jahnig | 34/57 |
| 3,304,894 | 2/1967 | Cox et al. | 110/15 |
| 3,306,236 | 2/1967 | Campbell | 110/8 |
| 3,397,657 | 8/1968 | Tada | 110/8 |
| 3,508,341 | 4/1970 | Price | 34/57 |
| 3,515,381 | 6/1970 | Foch | 110/8 X |
| 3,540,388 | 11/1970 | Smith et al. | 110/8 |
| 3,552,333 | 1/1971 | Salamon | 110/15 |

*Primary Examiner*—Kenneth W. Sprague
*Attorney, Agent, or Firm*—Limbach, Limbach & Sutton

[57] ABSTRACT

Method and apparatus are disclosed for liquid waste disposal using combustible waste material as a fuel in a fluid bed reactor. One combustion ingredient can be solid waste and one liquid waste ingredient can be sewage sludge. Control of the liquid feed is disclosed to control fluid bed temperature and control of combustible material feed is disclosed to control oxygen-to-combustibles ratio in the combustion chamber. A secondary bed/elutriation arrester may be provided above the principal fluid bed. Particle separators for the combustion gases are provided and air pollution suppressants are added to the bed as required.

68 Claims, 20 Drawing Figures

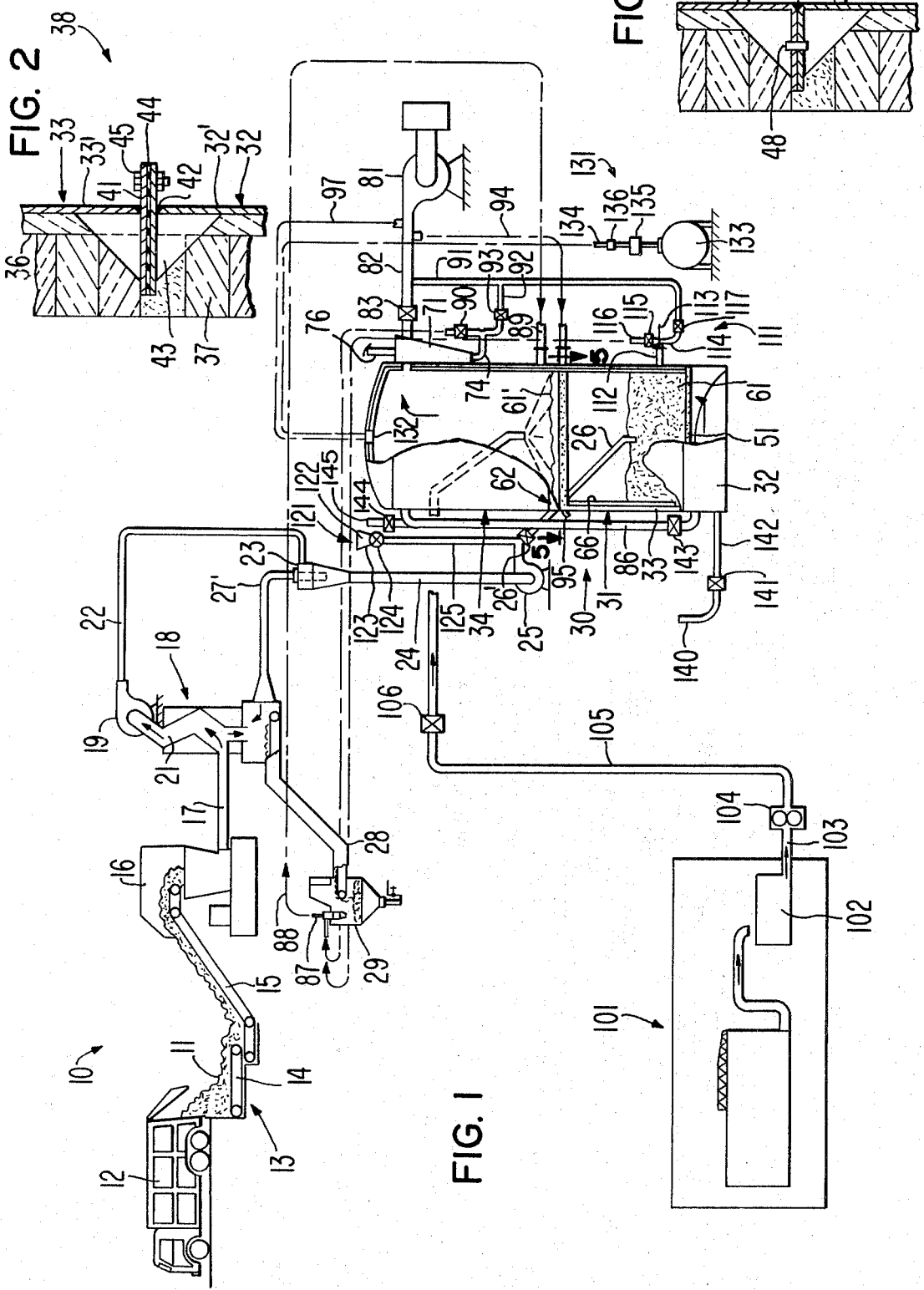

FIG. 3
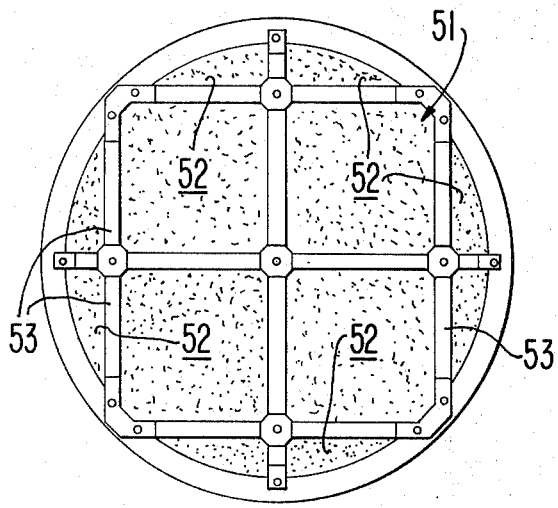
FIG. 3A
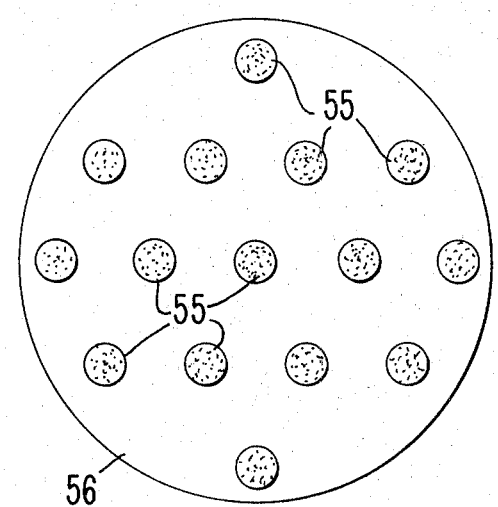
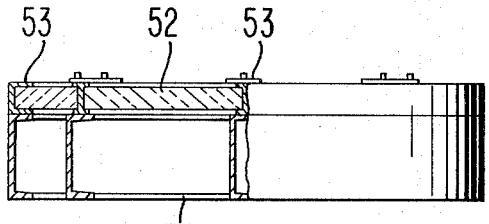
FIG. 4
FIG. 4A
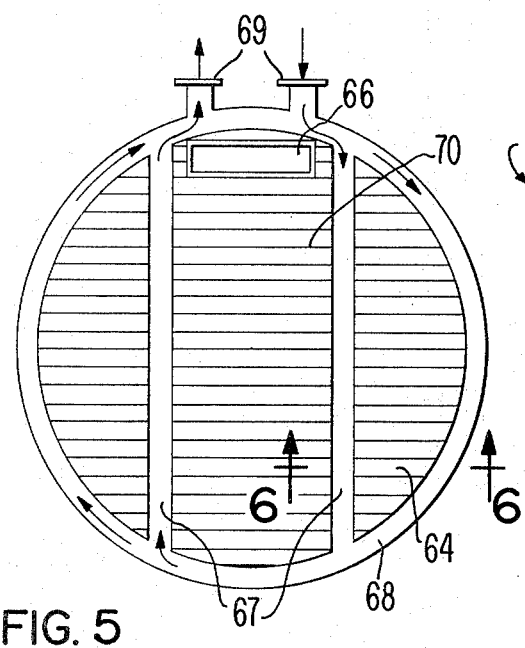
FIG. 5
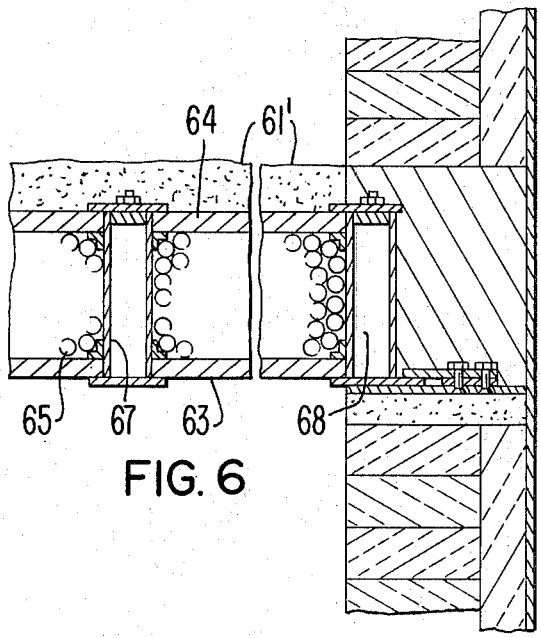
FIG. 6

METHOD AND APPARATUS FOR LIQUID DISPOSAL IN A FLUID BED REACTOR

BACKGROUND OF INVENTION

The present invention relates in general to fluid bed reactors and more particularly to a method and apparatus for pollution-free disposal of high water content liquid waste using solid and/or liquid and/or gas waste as fuel.

Municipalities as well as many industrial plants throughout the world produce liquid wastes in many forms, ranging from muncipal sewage sludges to industrial process sludges. The processing and ultimate disposal of these liquid wastes has become a severe environmental problem and an economic burden to the operators of such plants and to the surrounding communities. Typically, liquid and solid waste have been disposed of independently resulting in high costs to a given industrial plant or municipality. U. S. Pat. No. 3,589,313 SOLID WASTE DISPOSAL METHOD AND APPARATUS describes a solid waste disposal system for consuming solid waste, features of which include the use of fluid bed reactors. Reissue Pat. No. 26,514 TREATMENT AND DISPOSAL OF WASTE SLUDGES describes method and apparatus for disposing of dewatered sewage sludges containing combustible organic waste matter also wherein fluid bed combustion reactors can be utilized. U. S. application Ser. No. 847,994 discloses a solid waste disposal and water purification method and apparatus wherein a gasifier assembly is utilized to pyrolyze solid waste and produce hot fuel gas and active char. The active char is removed from the gasifier assembly and mixed with incoming polluted water for water purification wherein after the contaminated char is used in part in a combustor to provide heat to the pyrolyzing stage and another part is reactivated for reuse in water purification.

SUMMARY OF THE INVENTION

The object of the present invention is to provide a unique method and apparatus for simultaneously disposing of liquid waste and solid waste economically and efficiently in a pollution-free manner.

Broadly stated, the present invention, to be described in greater detail below, is directed to a waste disposal method and apparatus utilizing a combustion housing containing a bed of inert or chemically reactive granular particles having a heat storing, heat radiating, and in some cases a chemical reactive capability and wherein combustion air is introduced to the bottom of the bed for maintaining the granular material in a fluidized state. Combustion ingredients, such as shredded solid waste, rice hulls, sawdust, waste petroleum products, etc., are introduced into the combustor and liquid waste such as sewage sludge, industrial sludge, food processing waste, etc., is introduced into the combustor and the combustion conditions in the bed are controlled to combust and consume both the solid waste and liquid waste in a pollution-free manner.

It has been discovered that qualities of both solid waste and liquid waste can be uniquely combined in this fluid bed combustion apparatus to efficiently and economically dispose of both types of material simultaneously.

It has also been discovered that by using waste combustion ingredients as fuel, liquid wastes with water content as high as 100 percent can be disposed of in a pollution free manner in this fluid bed combustion apparatus in an efficient and economical way.

In accordance with another aspect of the present invention, the rate of feed of the liquid waste or sewage sludge is controlled to maintain the temperature of the bed at a desired level. The cooling properties of the liquid waste can keep the temperature of the fluid bed at a desired level wherein undesired air pollutants are not generated.

Another aspect of the present invention is the provision for feeding the solid wastes to the combustion stage at the rate to maintain the desired balance of oxygen-to-combustibles in the combustion zone thereby also insuring that the combustion gases produced as a result of disposal of the solid and liquid waste are within acceptable limits so as not to pollute the atmosphere.

In accordance with still another aspect of the present invention, the method and apparatus includes provisions for adding a secondary bed/elutriation arrester that can be positioned in the combustion chamber above the static position of the primary bed for arresting elutriation of the primary bed particles and consequently allowing for an increase in fluidizing air flow and a resulting increase in system capacity not achievable by a system not using said secondary bed/elutriation arrester. The secondary bed/elutriation arrester also subdues main bed pulsation, sloshing, geysering, large bubble formation, etc. It serves as a flame barrier for the combustion in the primary bed; provides for more thorough mixing and longer retention of the combustibles in the primary bed; and acts as a filter or particle collection/retention device. During combustion of various solid and liquid wastes, molten nodules of various materials, such as aluminum, are formed. These nodules are broken apart upon impact with the secondary bed/elutriation arrester to form smaller droplets that can more easily oxidize or vaporize to the point where slagging, clinkering and ash build up is reduced or eliminated. The combination of the secondary bed/elutriation arrester of an aforementioned feature and the particle separators of this feature will clean the exhaust gases to the point where particulate loading will be typically less than 0.01 grains per standard cubic foot, far exceeding current or proposed air pollution standards.

In accordance with still another aspect of the present invention, the method and apparatus includes provision for adding air pollution suppressant to the bed of inert particles upon demand. Since solid waste inherently includes chemicals which serve as pollutants, this automatic feed of pollution suppressant material will enable the combustion system to accommodate variations in the type and content of the solid and liquid waste directed to the combustion stage.

In accordance with still another aspect of the present invention, a closed residue collection and storage system is provided resulting in a dust and odor free collection and storage area for all residue material being produced by the processing and combustion of the solid and liquid waste. This includes flyash removal by the particle collectors, spent fluidized bed material that may be removed from the fluidized bed and the heavy, non-combustible material that may be removed by an air classifier following a shredding stage that is used for particular types of solid waste.

In accordance with still another aspect of the present invention, the method and apparatus includes provisions for adding turbochargers into the exhaust gas stream. The use of turbochargers to extract the energy from the systems exhaust gases provides an alternative, efficient and economical, method of providing some or all of the combustion and cooling air to operate the system thus reducing or eliminating the need for the present method of supplying combustion and cooling air and its associated power requirements during system operation. The pre-heating of the air that the turbocharger accomplishes also increases the efficiency of the overall system.

In accordance with still another aspect of the present invention, the method and apparatus includes provisions for use of the thermal energy of the hot exhaust gases for use such as plant heating or air conditioning, production of steam, drying cycles, and other uses.

In accordance with still another aspect of the present invention, an alternative use for the method and apparatus is its use as an efficient, economical and pollution free solid waste disposal system using water or other liquids as the combustion temperature control media.

DESCRIPTIONS OF THE DRAWINGS

FIG. 1 is a side elevational schematic view illustrating the present invention.

FIG. 2 is an enlarged elevational sectional view of one portion of the structure shown in FIG. 1.

FIG. 2A is similar to FIG. 2 showing an alternative construction of the present invention.

FIG. 3 is an enlarged plan view of the distributor plate portion of the structure shown in FIG. 1.

FIG. 4 is an elevational view, partially in section, of the structure shown in FIG. 3.

FIGS. 3A and 4A are views similar to FIGS. 3 and 4, respectively, and illustrating an alternative construction for the present invention.

FIG. 5 is a view of a portion of the structure shown in FIG. 1 taken along line 5—5 in the direction of the arrows.

FIG. 6 is an elevational sectional view of the structure shown in FIG. 5 taken along line 6—6 in the direction of the arrows.

Other objects and advantages of this invention will become apparent when reading the following description and referring to the accompanying drawing in which similar characters of reference represent corresponding parts in each of the several views.

PREFERRED EMBODIMENT—MUNICIPAL SYSTEM

Figure 12:
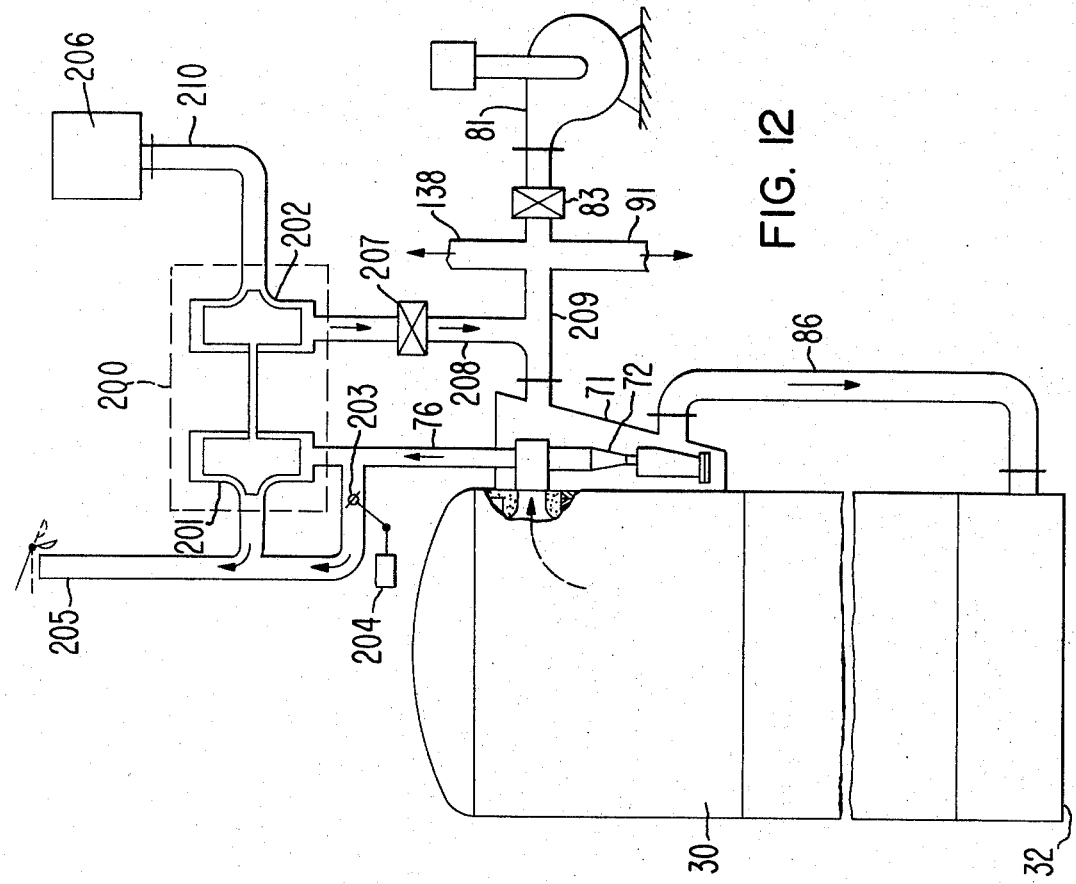
FIG. 12 is an enlarged elevational schematic view of a turbo-charger subsystem with the present invention.
Figure 7:
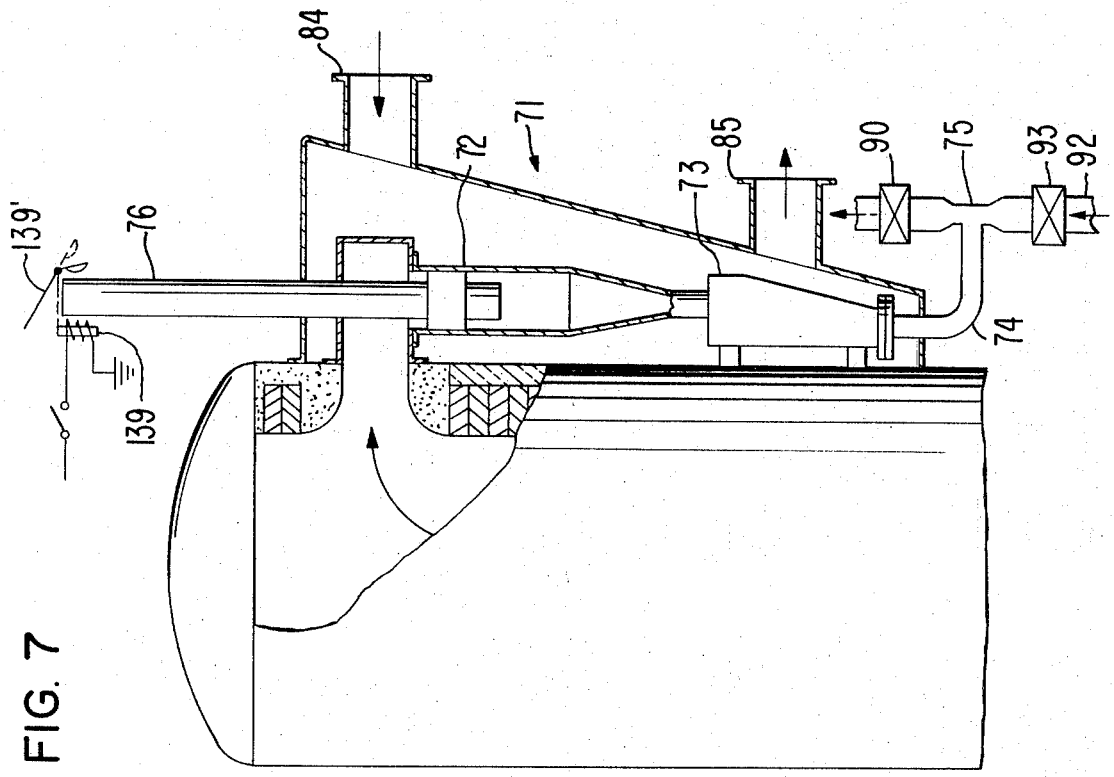
FIG. 7 is an enlarged elevational view, partially in section, illustrating a collector module shown generally in FIG. 1.

While the present invention is well suited for the pollution free disposal of various liquid materials using the heat generated by the simultaneous combustion of one or various solid waste fuel materials, one configuration of the invention is ideally suited for the use of municipal solid waste as a fuel to dispose of high water content municipal sewage sludge from a given population segment. Accordingly, the invention will be described with reference to such a system.

Referring now to the figures with particular reference to FIG. 1, the combustion system includes three principal assemblies, first the solid waste delivery assembly 10 where solid waste material is collected, shredded and separated, second the sewage sludge or waste water delivery assembly 60, and third the combustion assembly 30 where the solid waste is used as a fuel to dispose of the sewage sludge.

In the solid waste delivery assembly 10, solid waste 11 is received, typically in refuse or garbage collection trucks 12 which deliver the waste in either compacted or uncompacted form into a receiving pit 13 sized to act as a storage area, so that the system can operate continuously while receiving solid waste only over a specified period of the day. From the pit 13 the waste 11 is delivered first by a pit conveyor 14 and then a shredder feed conveyer 15 into the top of a shredder 16 such as a belt driven vertical, rotor, shredder grinder. The waste is gradually reduced in size and ejected into an exhaust chute 17 leading to an air classifier 18.

The effluent from the shredder is a homogeneous mixture with particle size, depending upon the shredder setting and the feed and rate, from the very fine to 1 by 2 inch and larger. The steel and other ductile metal is in small balls with some coinage. Wood is toothpick to pencil size. The more flexible material, such as soft plastic and soft materials such as rubber, are the largest particles.

High density, non-combustible particles coming out of the shredder 16 are removed from the process stream by the air classifier 18. This is done primarily to protect subsequent feed processes since the material removed has little heating value and hence would be little altered in volume or weight by the combustion process. Also, the air classifier provides a means for separating the reclaimable metal, glass, etc., for recycling to the appropriate industries for reuse if desired.

In the air classifier 18 a large blower 19 is used to suck the refuse up through an inclined treacherous path 21 and out through a tube 22 to a velocity reducer/solid waste accumulator system in the form of a cyclone inertial separator 23 which removes the major portion of the air used during the air classifying cycle and returns it to the inlet of the air classifier. The size of the heavy particles that are dropped out by the air classifier can be regulated by adjustment of the velocity of air going through the system. The air classifier/solid waste feed subsystem is a completely enclosed system with the result that all odors, dust and potential pollution problems are completely contained.

In the particular operative embodiment of the invention described in greater detail below the air flow required to inject the solid waste into the bed of the fluid bed combustor is approximately 500 CFM. Consequently, it is necessary to reduce the volume of air from the air classifier to the fluid bed combustor. This is accomplished by the air volume reducing cyclone inertial separator 23 which also acts as a plenum or reservoir to smooth out the flow of solid waste prior to its entry into the combustor. The solid waste from the cyclone separator 23 passes through pipe 24 to a combustion feed blower 25 where it is delivered through pipe 26 into the fluid bed of a combustor. The feed blower 25 provides a positive air bleed and solid waste feed from the cyclone outlet, thus eliminating potential plugging and also boosts the system pressure supplied by blower 19 to the desired pressure for proper fluid bed combustor injection. Other feed systems are described below with reference to FIGS. 16 and 17.

A large volume of clean air is vented from the cyclone 23 and recirculated through pipe 27 into the plenum of the air classifier reject material collection box.

The heavy non-combustible reject material from the air classifier is carried via a conveyor 28 to a residue storage bin or bins 29 where it is collected in a separate bin or combined in a common bin with the flyash removed from the combustion exhaust gases and with the spent fluidized bed material removed from the combustion stage as described in greater detail below. The material in the storage bin 29 can be disposed of periodically by land fill or ultimately by further reclamation of some or all of the materials contained in the residue.

The combustion housing 31, of the combustor assembly 30, is formed by joining together factory prefabricated and assembled combustor segments 32, 33 and 34 and the combustor dome 35. One of the objectives of the combustor design is to have each segment completely preassembled, including insulation, refractory, instrumentation, etc., prior to shipment to installation site thus reducing the need for inexperienced and expensive on-site labor. Although the combustion housing and the combustor segments can be made of any size, two preferred sizes are 9½ feet outside diameter and 8 feet outside diameter with the maximum height of each segment being 8 feet. Eight foot diameter segments, 8 feet tall can be shipped anywhere in the U. S. by truck, rail, air or water without any special shipping restrictions. The 9½ foot diameter segment, 8 feet tall can be shipped to 95 percent of the U. S. without any special restriction other than applying for a wide load permit that will be approved by the simple act of signing the application. Sizes larger than this require special permits with the associated road restrictions and in some cases fees.

FIG. 2 illustrates a preferred construction for joining the separate segments 32–35. Each of the segments such as 32 and 33 including metal shell, 32' and 33' respectively housing insulation 36 surrounding fire brick 37 and the shells 32' and 33' are joined together by a bolted joint 38.

The joints 38 are formed by a pair of annular flange plates 41 each welded at 42 to one of the shells and to a plurality of angle plates 43 positioned circumferentially about the shell. A gasket 44 is clamped between the flange plates 41 by means of bolts 45 passing through holds positioned inwardly from the periphery of the plates. At the construction site the segments are assembled one on top of another and bolted together at the joints 38.

An alternative welded joint is illustrated in FIG. 2A and includes a peripheral weld 47 between the flange plates 41. Alignment pins 48 are provided to initially align the different segments prior to formation of the welded joint 46. Attachment pads 49 are provided on the shells 32' and 33' to position a saw jig used to cut the welded joint 46 in the event repair or replacement of segment elements necessitates disassembly of the unit.

At the base of the combustion assembly 30 the air box segment 32 handles medium temperature (typically from 100 to 1,000° F) preheated combustor fluidization air.

An air distributor plate 51 is provided at the top of the air box 32 for supporting the bed material 61 within the adjoining next segment 33 of the housing 31. The distributor plate 51 is made up of a group of porous ceramic plates 52 (See FIGS. 3 and 4) that are held in place by metallic segments 53 and supported by a metallic frame 54. The distributor plate 33 can be made in a variety of other ways; one of which is the use of a number of individual porous ceramic or metallic nozzles or tuyeres 55 (See FIGS. 3A and 4A) installed in a refractory insulated support plate 56.

The distributor plate 51 supports the fluid bed material 61 when it is not being fluidized and provides even distribution of the air across the bottom of the bed during fluidization. During combustor pre-heat, which is described in greater detail below, hot air is caused to flow in a reverse direction through the fluid bed material 61 and through the distributor plate 51. The porous ceramic plates 52 or tuyeres 55 provide the necessary support for the bed material during pre-heat while preventing any bed material from passing or sifting through to the air box 32.

The fluidizing air is caused to flow through the bed material particles under carefully controlled conditions. Chief among these conditions is the requirement that the air velocity through the bed, and hence the pressure drop, be greater than the value required to support the bed weight and less than the value required to sweep the particles out of the bed. In addition, the bed must consist of particles within a suitable range of size, shape and density. When these conditions are all satisfied, the stationary bed will have expanded and the bed particles will exist in a fluidized state. If the movement of one specific particle could be observed, it would be seen to undergo a continuous, turbulent motion and would wander throughout the bed in a random manner. Viewed as a whole, the dynamic condition of the fluidized bed resembles a tank of boiling water in the sense that there is considerable turbulence and bursting of bubbles at the surface. It is this dynamic characteristic which imparts to a fluidized bed its unique advantages.

The inert or chemically reactive bed materials used with the fluid bed combustor are chosen to withstand the combustion temperatures without melting or slagging. The specific bed materials selected can fall within a wide variety of inert materials, ranging from the inexpensive silica "beach" sand to the more exotic ceramic materials (usually alumina or silicon carbide) and to chemically reactive materials such as ground limestone, dolomite, and others. The bed material is preheated to a predetermined temperature and then fluidized as described in greater detail below. When this fluidized state and this temperature are achieved, the combustibles are injected into the bed.

Among the several significant influences on the combustion process under fluidized temperature conditions are the following. The heat capacity of the bed together with the intimate contact between the bed and incoming combustibles, rapidly heats the combustibles to ignition temperature and increases the rate of pyrolysis of each combustible particle. The bed material serves to retain and mix the combustibles providing rapid and complete combustion for a range of solid particle sizes. The charred surface of the burning solid material is continuously abraded by the bed material, exposing unburned material to the hot bed and increasing the rate of new char formation and oxidation. Gases in the bed are continuously mixed with the bed material thus increasing the flow of gases to and from the burning solid surface as well as the completeness and rate of gas phase combustion reaction. The large heat capacity of the bed material and the continuous and thorough mixing of the combustibles with the bed material provide for a very even bed temperature and the complete elimination of hot spots that are commonplace with conventional combustors and incinerators and are likely to produce undesired air pollutants such as oxides of nitrogen. Additionally, during combustion the bed material absorbs heat from the combustion gases, thus stabilizing the combustion temperature. The absorbed heat is controlled by introducing the liquid waste to maintain the proper temperature within the combustion zone and housing.

From the air pollution standpoint, four types of noxious gas are of potential concern. These include oxides of nitrogen, oxides of sulphur, hydrogen halides, and carbon monoxide and unburned hydrocarbons. Both the rate of formation and the equilibrium concentration levels of oxide and nitrogen are strongly influenced by temperature, and the low uniform temperature of the combustion system of this invention (1,300 to 1,600° F) limits the formation of oxides of nitrogen. Lime (CaO) and limestone help control $SO_2$ emission. Lime is present in the solid waste and limestone injected into the combustion chamber as described below is calcinated to lime by heat. $SO_2$ is oxidized to $SO_3$ on the lime surface and then reacted to calcium sulfate $CaSO_4$ which remains with the ash. Although the plastics in domestic use are predominately polyethylene and polystyrene which do not produce corrosive products of combustion, polyvinylchloride does comprise about 16 percent of the total plastic sold for household use. When burned, polyvinylchloride (PVC) will produce hydrochloric acid gases. The emission of these hydrogen halides (primarily HCl) can be expected to be a significant problem for future incinerators when combusting solid waste, probably more significant than $SO_2$ emission. Although limited experimental work exists on HCl suppression, chemical considerations indicate that the limestone reaction or other such chemical reaction previously described for $SO_2$ suppression, may be equally effective for HCl. The highly mixed, oxygen-rich, environment of the fluid bed reactor provides very favorable conditions for complete combustion, thus minimizing carbon monoxide and unburned hydrocarbon emission.

Towards the top of housing segment 33, a secondary bed/elutriation arrester 62 is provided in the form of lower and upper perforated retention plates 63 and 64 respectively with the void therebetween filled with a labyrinth type of obstruction 65 such as ¾ inch diameter alumina spheres. The plates 63 and 64 are mounted in the housing 31 in a horizontal plane or at a slight angle with a downcomer or return chute 66 located at one or more points around the periphery of the bed. (See FIG. 5). The return chute 66 is open at the upper plate 64 only, penetrating the secondary bed 62, the lower support plate 63, and the main fluid bed 61 to within a short distance of the distributor plate 51.

The cross-sectional area of the downcomer 66, the depth to which it penetrates the main fluid bed 61, the configuration of the bottom outlet of the downcomer 66; the angle of the support plates 63 and 64, the thickness, configuration and size of openings in the support plates 63 and 64, the configuration of the labyrinth obstruction 65; and the height relationship of the secondary bed/elutriation arrester assembly 62 with the primary bed 61 are all chosen in the particular application to provide and maintain a shallow bed of fluidizing material 61' on top of the secondary bed 62. This shallow bed depth along with the labyrinth obstruction in the secondary bed 62, whose voids are filed with smaller particles during fluidization of the lower bed action, provides a very even flow of gases through the upper bed and very little chance of bubble formation and its associated elutriation from the top surface of the bed.

The support plates 63 and 64 are supported by hollow stainless steel beams 67 which are welded onto curved rectangular stainless steel tubes 68 between the plates at the periphery thereof. These tubes are fastened to the shell 33' of the combustor segment 33 and are tied into bosses 69 extending out from the same or opposing sides of the shell 33' providing for passage of bleed air from the combustor air blower. The supported structure of the secondary bed 62 is kept cool, and consequently structurally strong, during combustion operation by the flow of some of the combustion feed air through the hollow portions of the support system.

The perforations 70 in plates 63 and 64 are spaced in size so that the ¾ inch inert high temperature spheres 65 cannot fall or be blown through. These openings will, however, permit the elutriating sand from the primary bed 61 to provide a scrubbing action on and around the surfaces thereby keeping them clean of any ash or foreign matter buildup. It has been found that the use of a secondary bed drastically reduces the elutriation rate from the primary bed and those particles that are elutriated during use of the secondary bed are only of very small size.

Attached to the side of the upper housing segment 34 are one or more exhaust gas particle collector modules 71 in which are mounted a plurality of exhaust gas particle collectors 72 such as inertial separators, the lower particle collection portions of which are connected to a flyash removal plenum 73 for passage of the material through a pipe 74 to a pneumatic educator 75 and then to the residue storage bin 29. Each inertial separator 72 includes an exhaust stack 76 for exhausting the cleaned gas to the atmosphere or to other devices such as turbosupercharges, steam boilers, etc., when use of the exhaust gas energy is desired. System combustion air is directed from an air blower source 81 through a pipe 82, valve 83, and boss 84 into the exhaust gas particle collector module 71 to provide cooling to the hot parts of the module assembly and to pre-heat the combustion air prior to use for fluidization. Pre-heated combustion air exits through port 85 and is then directed through pipe 86 to the air plenum segment 32.

The particle laden gas from the combustion chamber enters the inertial separators 72 at the top passing through vanes thereof causing the particles to be thrown to the outer wall by centrifugal force where they are then decelerated and fall to the bottom of the collectors and into the flyash removal plenum 73. The clean gas remaining in the separators passes upwardly through the exhaust stacks 76 and is discharged to the atmosphere.

In reality when a secondary bed/elutriation arrester is used, the inertial separators 72 serve as secondary stage particle collectors. The secondary bed 62 acts as a granular filter and filters out some of the coarse and fine particles that would otherwise enter the particle collectors 72.

The flyash removed by the inertial separators 72 is transported through pipe 74 to the pneumatic educator 75. Air from the main line 82 from system combustion air blower source 81 via a bypass line 91 and a branch line 92 with valves 90 and 93 is used to cause the educator 75 to function and to cool and transport pneumatically the flyash to the residue storage bin 29. The ash ladened air mixture enters the storage bin 29 through one or more inertial separators 87 where the majority of ash is separated from the air. The cleaned air emitted as exhaust from the inertial separator 87 may still contain some particulate. To avoid any pollution being emitted to the atmosphere at this point the exhaust is recycled back into the upper segment 34 of the combustor assembly 30 by way of pipe 88 and boss 89.

Not only combustion air for the air box but also cooling air for various subsystems, and other pneumatically driven subsystems are provided by the combustion air blower 81 such as a centrifugal blower. Besides bypass line 91, another bypass line 94 from pipe 82 is used to direct cooling air to the secondary bed 62 support structure and thence through pipe 95 to pipe 86 and to air plenum box 32.

The municipal or industrial liquid waste or sewage treatment plant (or other liquid waste source) is represented by item 101. The sludge or other waste liquid is delivered from this site to the combustor through the appropriate conduit and pumps. The system of the present invention is capable of receiving and consuming sewage sludges of very high water content (as high as 100 percent water if that be the liquid waste disposal problem) without any type of dewatering step or process as is required by other sewage sludge disposal systems. If the system of the present invention is used in conjunction with a sewage treatment plant that is using digesters, the digester system can be deactivated and one of the digester tanks used as a storage and/or thickening tank 102. In this way, all the sewage sludge along with the supernatant liquor (that previously was returned as an influent to the sewage plant system) will be fed to the combustor and consumed in a pollution-free manner. Not only will the shutdown of the digester system save operating and maintenance costs, but it will also eliminate the high concentrations of soluble compounds of nitrogen and phosphorous (known, in part, as supernatant liquors) that the digesters, in their normal operation, return as an influent to the sewage treatment plant and thence into the outflow stream. Fertilization of receiving waters by nitrates & phosphates is now recognized as one of the major water pollution problems. The present invention thereby eliminates the requirement of land drying, land filling, or other methods for disposal of the digested sludge that must be removed from plant digesters.

In addition to the liquid or sewage sludge wastes produced by liquid treatment plants, other hard to handle wastes can be directly disposed of in the combustion system of the present invention. These include screenings, such as rags, sticks, garbage, etc., inorganic solids normally removed by gravity settling in the grit chamber, such as sand, gravel, grit coffee grounds, ashes, silt, etc., and scum or skimming collected from the sedimentation basins or separate skimming tanks, usually having a high concentration of grease and fibrous wastes.

Since the fluid bed is insensitive to high or low Btu value material, liquid wastes such as waste oil, greases and skimmings can be added with the liquid or sewage sludge and injected into the bed. There these materials will be completely disposed of in a pollution-free manner without affecting the operation of the system.

The sludge from the sludge storage tanks 102 is moved via one or more pipes 103 to one or more sludge pumps 104 and via one or more pipes 105 through one or more valves 106 to the combustion chamber where it is injected as a spray on top of the bed 61 or injected above and below the secondary bed 62 at one or more places. The liquid waste is used to control the temperature of the bed material as well as the air temperature (after burning) above the bed to provide for optimum combustion and pollution operating conditions. Solid waste, if allowed to burn stoichiometrically, will attain temperatures of 3,000–3,500° F which is too high for proper $NO_x$ emission control. Additionally, the fluid injection, along with the action of the secondary bed, aids in control of sticky flyash and slag and clinker formation common in incinerators having poorer temperature control and the consequent hot spots. The rate of feed of the sewage sludge is controlled to maintain the desired temperature in the combustion zones as set forth in greater detail below.

A bed removal system 111 similar in design and operation to the flyash removal system provides for continuous removal of small amounts of bed material during operation of the combustor. When fluidized, the bed is in continuous motion and, consequently, all particles within the bed are homogeneously mixed at the superficial velocities at which the bed will be operating. Bed material can therefore be removed from any point within the bed without affecting the mix of the material being drawn off. Bed material will be removed so that spent or poisoned limestone or lime or other bed material chemicals that have been added that has reacted with the sulfurics and hydrogen halides within the bed can be removed and fresh bed material added for continuous clean up of these corrosive gases. Additionally, small amounts of combustible particles are unavoidably injected into the bed along with the combustible waste material and remain there until either completely oxidized and consumed or until removed along with the spent bed material. Furthermore, small grandules of agglomerated ash tend to build within the bed and these particles will also be removed along with the bed material.

In the bed removal system 111 a drain pipe 112 is provided where the bed material will drain by gravity through plunger valve 113, into pneumatic eductor 114 where it is then coveyed pneumatically through valve 115 and pipe 116 to the residue storage bin 29 by bleed air in the pipe 91 from the blower 81 passed through a valve 117 upstream of the drainpipe. The primary system bed depth is controlled by the bed material removal system as set forth in greater detail below.

A bed additive feed system 121 is provided for automatically feeding, upon demand, fresh limestone or other bed additive chemical reactive materials to the fluidized bed during operation. As set forth above, these additives react with the corrosive or other pollutant gases or materials within the bed and reduce or prevent noxious fumes from escaping to the atmosphere. This bed additive system interfaces with the solid waste feed pipe 26 downstream of the combustor feed blower 25. The limestone 122 or other additive is held within a bin 123 and passed through an airlock feed valve 124 and feed pipe 125 to the feed pipe 26. Other means of adding bed material additives, or combinations of, may be used and could include: a separate feed system from that used for the solid or liquid waste feed system; injected as a powder or liquid slurry with the liquid waste stream.

The feed rate of the bed material additive system is controlled by an exhaust gas monitoring system as set forth in greater detail below.

A bed pre-heating system 131 is provided for bringing the bed material up to a temperature high enough to ignite the solid waste as it is fed into the fluid bed. The minimum temperature for this autoignition is about 1,000° F. Pre-heating system 131 includes a natural gas, diesel or fuel oil fired oil burner 132, or any other type of burner, installed in the dome of the combustor 30 above the secondary bed/elutriation arrester 62. Fuel is directed to the burner 132 from a tank 133 via a line 134 using a pump 135 and valve 136 and oil burner combustion air is supplied via a valve 137 and a bypass line 138 from pipe 83 and main combustion blower 81.

To pre-heat the bed material, magnetic actuators 139 are energized to hold flapper valves 139' on the exhaust end of inertial collector exhaust stacks 76 in the closed and sealed position closing the stacks. Pre-heat exhaust valve 141 in conduit 142 leading from the air box 32 is opened, combustion air valve 143 in pipe 86 is partially closed and combustion air by-pass valve 144 in a bypass line 145 is opened. Combustion air blower 81 is turned on and, after an appropriate air purge of the combustor, bed pre-heat system 131 is ignited. The air above the main bed is heated to approximately 1,500° F and maintained at this level by control of oil burner combustion air. This 1,500° F air if blown through the main bed, in reverse flow to normal operations by the pressure build-up caused by the now closed exhaust stacks 76 and the heating of the air by the pre-heat burner system. The main bed is heated from the top, progressing towards the bottom, and the pre-heat air is then exhausted to the atmosphere via air box 32, conduit 142, valve 141 and exhaust stack 140. Air from the main combustor blower 81 cools the particle collector module 71, the secondary bed 62 support structure, solid and liquid waste feed pipes, etc., during the pre-heat cycle. Cooling air is also directed from pipe 86 through partially opened valve 143 into air box 32 to mix with exhausting pre-heat air so that the pre-heat exhaust gas temperature will be low passing through conduit 142, valve 141 and exhaust stack 140. As the portion of the bed next to the distributor plate 51 reaches approximately 800° F as sensed by a temperature sensor 146 in the lower portion of the fluid bed, the pre-heat system is automatically shut off and the combustor is ready for fluidization and solid waste feed. Due to the temperature gradient caused by the backflow of 1,500° F air in the combustion chamber, a temperature of approximately 800° F at the distributor plate 51 indicates an average temperature throughout the bed of approximately 1,200° F. Upon fluidization, the overall bed temperature rapidly stabilizes to about 1,200° F, more than adequate for autoignition of the solid waste material. Once the solid waste material is fed into the bed and as long as its feed is continued, the pre-heat starting system is no longer required and is deactivated during all solid waste/liquid waste combustion.

Figure 8:
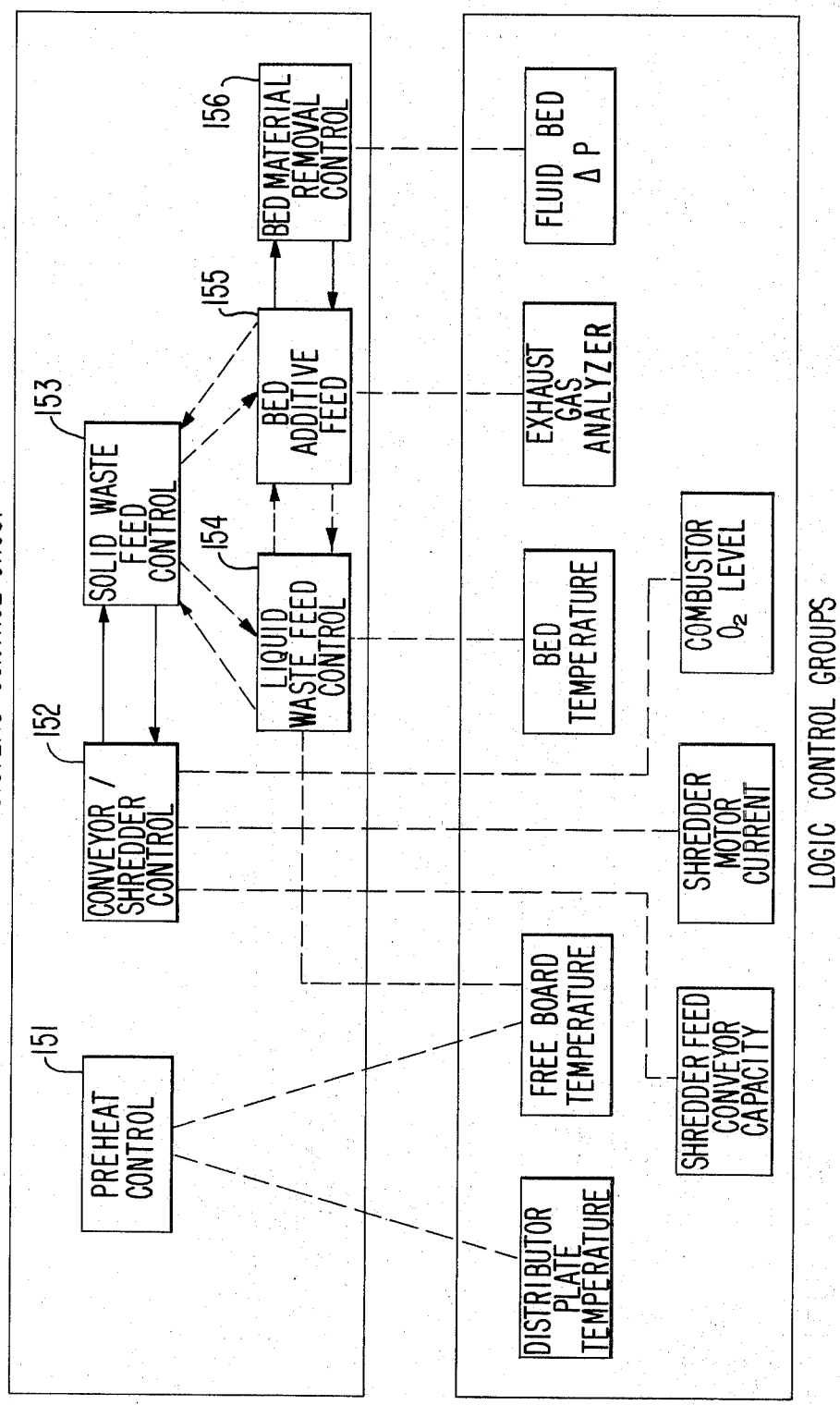
FIG. 8 is a schematic block diagram illustrating the operational controls of the present invention.

For operation of the combustion system an instrumentation and control subsystem is used consisting of the following six control groups and their associated control systems schematically illustrated in FIG. 8: combustor pre-heat control 151, conveyor/shredder control 152, solid waste feed system control 153, liquid waste feed control 154, bed additive feed system control 155, and fluid bed material removal control 156.

Figure 9:
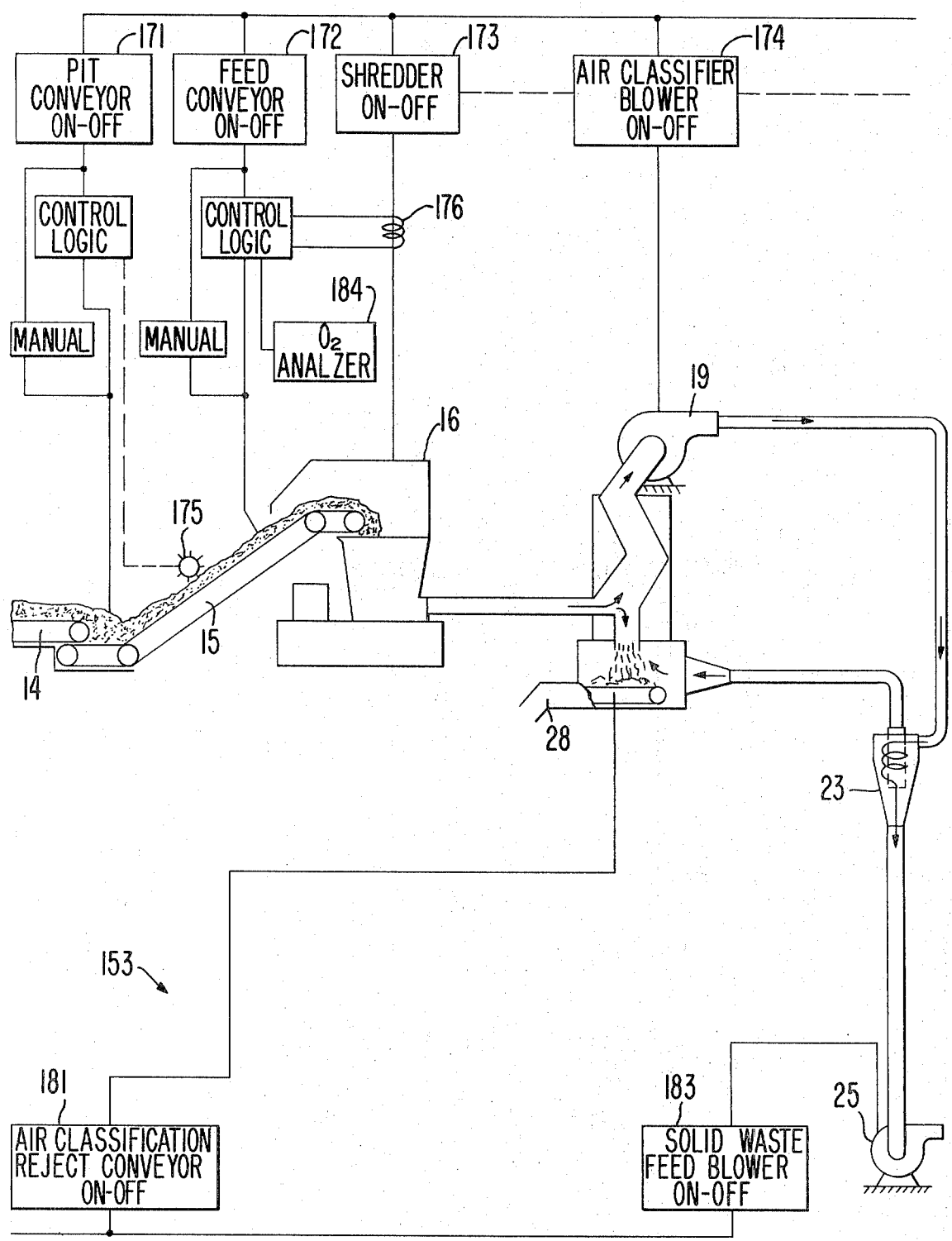
FIG. 9 is a schematic block diagram view of the solid waste feed system control.
Figure 10:
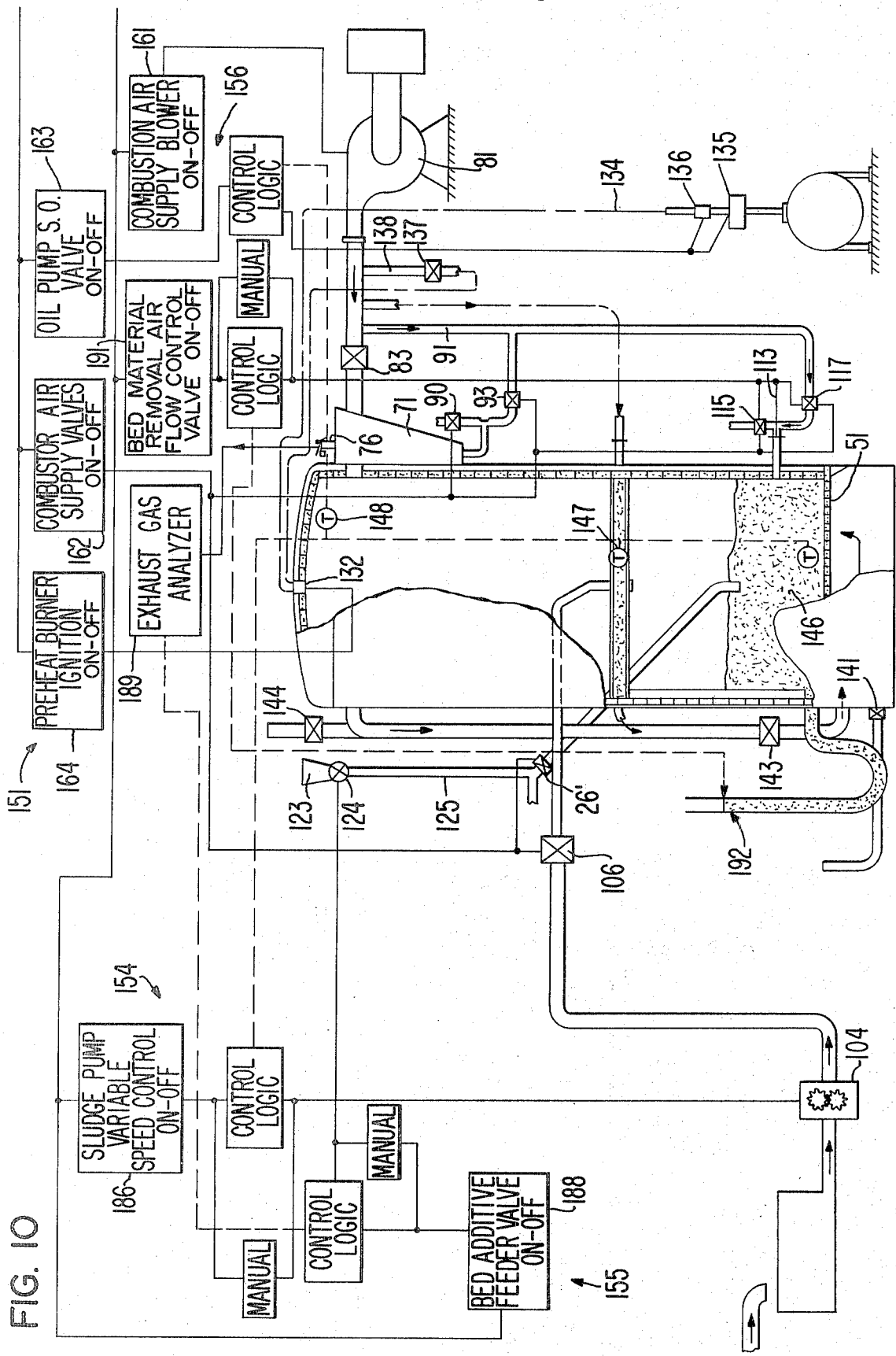
FIG. 10 is a schematic block diagram view of the combustor preheat control.

FIG. 9 shows the conveyor/shredder control 152 and the solid waste feed system control 153, and FIG. 10 shows the combustor pre-heat control 151, the liquid waste feed control 152, the bed material additive feed control 155, and the fluid bed material removal control 156.

Referring to FIG. 10, the combustor pre-heat control 151, includes switches and circuitry: 161 to turn on combustion air supply blower 81; 162 to close valves 90, 93, 115, 113, 117, 26' and 106; to actuate magnetic latches 139; to open valve 144 and 143, to open pre-heat exhaust valve 141; to open pre-heat burner air supply valve 137; to activate a timed air purge cycle of the combustor; 163 to turn on oil pump 135; 164 to turn on the pre-heat burner ignition of burner 132; and to open oil line shut-off valve 136. These switches can be controlled by an electronic logic system including logic cut-off with manual override where desired.

When the bed temperature, adjacent the distributor plate 51, reaches approximately 800° F (as detected by the temperature sensor 101) switches 163, 164 and valve 137 turned off thereby turning off the fuel and air for the pre-heat system. Air valves 90 and 93 are opened, magnetic latches 139 are deenergized and pre-heat exhaust valve 141 is closed.

To start fluidization and prior to starting solid waste feed, combustion air supply blower 81 is checked as on, by-pass valve 144 is closed and combustion air valve 143 is actuated to full open.

The conveyor/shredder control system 152, as detailed in FIG. 9, includes a switch 171 for the pit conveyor 14, a switch 172 for the feed conveyor 15, a switch 173 for the shredder 16, a switch 174 for the air classifier blower 19, a photocell load sensor 175 on the shredder feed conveyor system and an amperage sensing unit 176 on the shredder motor. With the photocell load sensor 175 positioned to sense the height of the solid waste load on the feed conveyor, photocell 175 will sense an overload and turn off the pit conveyor until such time as the shredder feed conveyor has cleared the load. The amperage sensing unit 176 regulates the amount of solid waste conveyed into the shredder by shutting off the feed conveyor when a predetermined overload on the motor is sensed. The air classifier blower and remaining portions of the solid waste feed system are shut off automatically by a delayed timer system in the event of an inadvertent solid waste conveyor or shredder shutdown.

Also as shown in FIG. 9, the solid waste feed system control 153 includes a switch 181 for the air classification reject conveyor 28, a switch 183 for the solid waste feed blower 25 and an $O_2$ analyzer 184 which determines the amount of oxygen available for combustion. The system controls the amount of solid waste that is fed to the combustor by sensing the oxygen level in the combustor. If the amount of excess air (oxygen level) falls below a pre-set amount (approximately 15 percent excess air) the solid waste feed conveyor 15 will be slowed down or stopped. If the oxygen level increases above 15 percent excess air, the solid waste feed conveyor 15 will be increased up to the operating load limit of the shredder 16.

The liquid waste feed control 154 includes a shut-off valve 106 and an on-off switch and variable speed control 186 for the sludge pumps 104 with a logic control for the variable speed control 186 connected to the temperature sensors; 146 in the bed; 147 in the secondary bed; and sensor 148 adjacent to the exhaust outlet. This liquid waste feed control functions to control the temperature within the combustor by controlling the amount of liquid waste being fed to the bed. The temperatures sensed in the various portions of the bed are used to modulate the liquid waste flow by varying the speed of the sludge pumps.

The bed additive feed control 155 includes a switch 188 responsive to an exhaust gas analyzer 189 for operating the air lock feed valve 124 for passing material from the bin 123. These elements control the feed rate of the limestone (or other bed additives) to the fluid bed by sensing the amount of corrosive or noxious gases present in the exhaust stream of the combustor. The exhaust gas analyzer 189 continuously monitors the level of corrosive or noxious materials in the exhaust gases.

The fluid bed material removal control 156 includes a logic control 191 for controlling the bed material removal air flow valve 117, shut-off valve 113 and the sequence valve 115. Bed differential pressure sensor 192 continuously measures bed height and signals valves 117, 113 and 115 to open in that sequence when bed level increases and closes valves 115, 113 and 117 in that order when equilibrium or low bed level is sensed.

EXAMPLE 1

While it is believed that utilization of this particular embodiment of the present invention is apparent to a person skilled in the art from the above detailed description, the following table lists various parameters and specifications of typical elements for one type and size of system in accordance with the present invention designed to consume at least 740 gallons per hour of 6 percent solid liquid sludge (350 lbs. per hour dry solids) using 1.1 tons per hour of solid waste as fuel.

Figure 1

COMPONENT DESCRIPTION

| Item No. | Item | Specifications | Capacity |
|---|---|---|---|
| 13 | Receiving Pit | Capable of receiving 20 tons per 8 hr period. | 10 Tons Storage (62 yds at bulk density=12 lb/ft$^3$) solid waste. |
| 14 | Pit Conveyor | Mayfran Mfg. Co.; Structure capable of withstanding impact loads when receiving solid waste. | 0 to 4 tons/hr at 12 lb/ft$^3$ solid waste. |
| 15 | Shredder Feed Conveyor | Mayfran Mfg. Co.; System capable of achieving peak capacity of 4 tons/hr at 12 lb/ft$^3$. Capable of achieving uniform feed rate over range of 1 to 4 tons/hr. | 0 to 4 tons/hr at 12 lb/ft$^3$ solid waste. |
| 16 | Shredder | Eidal International corp., Model 100; Max operating capacity of 4 tons/hr Peak limit of 6 tons/hr for one minute period. | 0 to 4 tons/hr solid waste. |
| 18 | Air Classifier | Has flexibility to classify solid waste flow rates up to 6 tons/hr. | 0 to 4 tons/hr solid waste. |
| 19 | Blower, Air Classifier | Rees Blow Pipe Mfg. Co., 19S-11 Modified; Has flexibility to transport solid waste up to 6 tons/yr. | 0 to 4 tons/hr solid waste 3000 cfm at 16"H$_2$O 7½ HP Motor. |
| 23 | Cyclone - Solid Waste Air Separator | Has flexibility to separate 0 to 4 tons/hr solid waste from transporting air flow. | 0 to 4 tons/hr solid waste and up to 4000 cfm air at 2 psig |
| 25 | Feed Blower Solid Waste | Rees Blow Pipe Mfg. Co., 6 HP; Handle up to 1.5 tons/hr solid waste. | 500 CFM at 60" H$_2$0 15 HP Motor. |
| 28 | Air Classifier | CPC; Handle variations in reject flow rate from that rejected by processing 1 to 4 tons /hr solid waste. | 4 to 16 ft$^3$/hr at 200 to 800 lbs/hr reject material. |
| 30 | Fluid Bed Combustor | Max oudside diameter =8'. Nominal Bed Area =38.5 ft$^2$. superficial velocity =7½'/sec-min. Operating temp. = 1500°F. | 1.1 ton/hr solid waste–20% moisture 350 bl/hr dry solid, sludge, 740 GPH, 6% solids, liquid sludge. |
| 81 | Combustion Air Blower | Hoffman Industries Model No. 38405A | 2700 scfm at 6 psig outlet, 100 HP motor. |
| 104 | Liquid Waste Pump | Two Moyno; Robbins & Myers Inc., 8; Max solids concentration =15% Max particle size thru pumps = 3/16" dia. Max flow rate/pump = 1000 gph. | Up to 1000 gph/ pump at 40 psi, HP motor. |
| 124 | Air Lock Feed Valve-Limestone | Mikro Airlock; Slick Industrial ⅛" dia & Co.; Resistant adjustable blades. Delta o across valve = 3 psi. Limestone feed rate te – max 1 ft$^3$/hr, 1/8" | Up to 1 ft$^3$/hr, smaller particles. ¼ HP motor. |

| 131 | Pre-Heat Oil Burner & Ignition System, Oil Pump & Piping | dia particle & smaller. Oil flow rate, 12 gal/hr. Will withstand 1600°F continuous temperature. | Eclipse Fuel Engr. Co. Model No. 168LCf-0. |
|---|---|---|---|
| 133 | Pre-Heat Oil Tank | Wards, 81C499-88RT. | 275 Gal. |

EXAMPLE 2A

Figure 11:
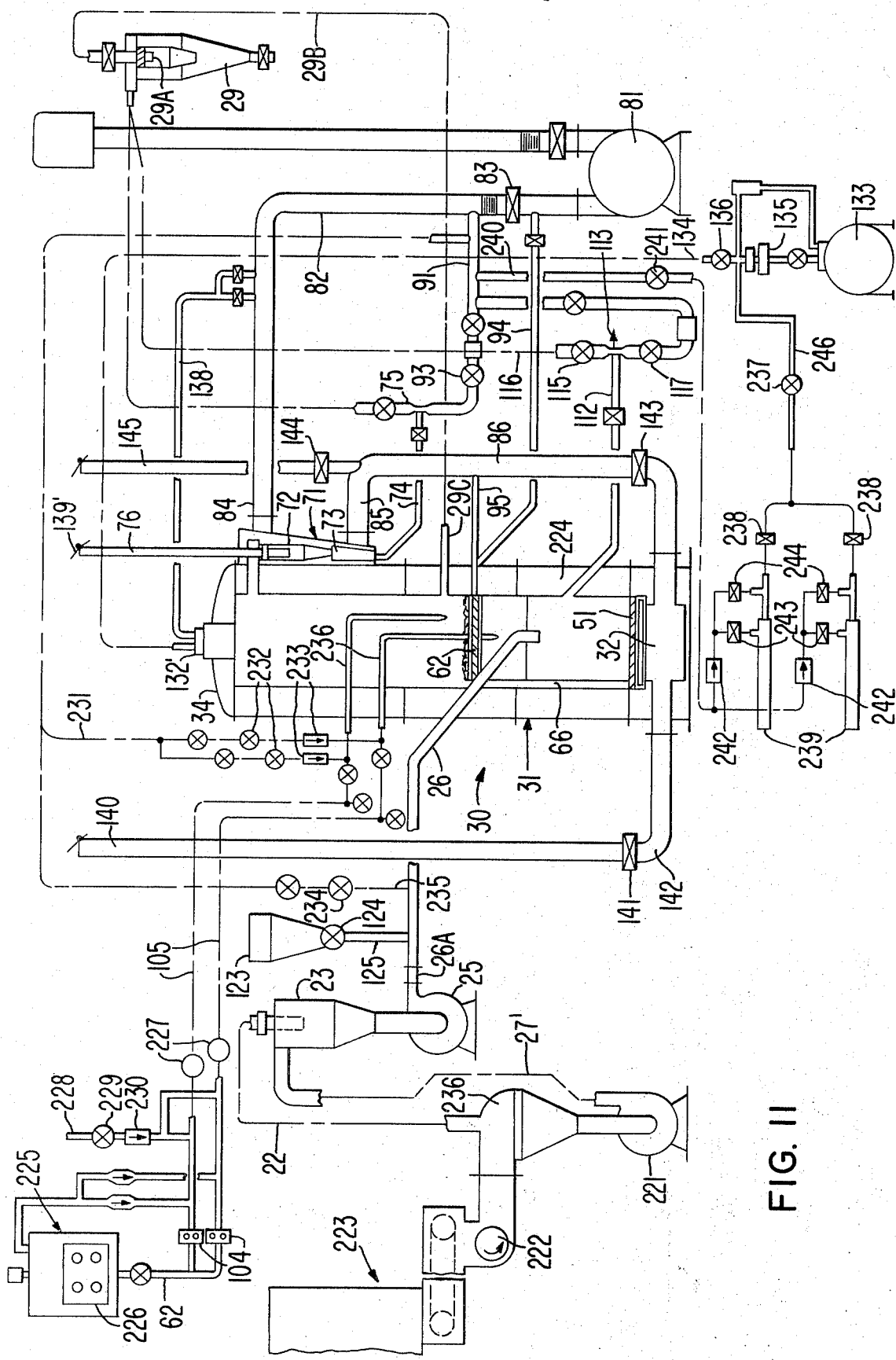
FIG. 11 is a side elevational schematic view illustrating another embodiment of the present invention.

To further expand upon the specifications of the present invention another preferred embodiment of the system, in the form of one of many variations of an industrial type and size, is shown schematically in FIG. 11. For clarity, ease of reference to previous discussions, and to show commonality in design where appropriate (but not necessarily in size, capacity or function) FIG. 11 uses some of the same item numbers on its components as are used in FIG. 1. As is apparent from the schematic, this system is similar to that already shown in FIG. 1. Therefore, only the new features will be discussed.

Combustor assembly 30, is 5 feet in outside diameter, has a combustor shell 31 thickness of ¼ inch, 2½ inches of mineral wool insulation 36, 6 inch thick A.P. Green Empire DP refractory fire brick 37, and has an inside diameter of 36 inches and a bed area of approximately 7 square feet. The combustor stands 17 feet 3 inches less the height of an Eclipse Model No. 126LCF-0 pre-heat burner 132'. A Hoffman Model No. 38405A combustion air blower 81 has a capacity of 2,700 scfm at 6 psig discharge pressure, enough to fluidize the bed to a superficial velocity of more than 15 feet per second. The solid and liquid waste capacity of the system varies, depending upon the type of waste material consumed. By comprising it with the heretofore discussed system, however, it can consume 400 lbs. per hour of solid waste (20 percent moisture, 5,000 Btu per lb. heating value) and 140 gallons per hour of liquid waste at a superficial velocity of 7½ feet/sec.; and 1,200 lbs. per hour of solidwaste and 400 gal. per hour of liquid waste at a superficial velocity of 20 feet per second.

This system is designed specifically but not solely for industrial use where the solid waste material does not require shredding to be pneumatically transported and fed into the combustor and where the liquid waste material is of one or many liquids that can be fed into the liquid waste storage and mixing tank 225. A mixing paddle 226 is provided to keep liquids in suspension when necessary for uniform feed. Two liquid waste pumps 104 pump the liquid through flow switches 227 and through pipes 105 to the nozzle or nozzles in the combustor 31. Air cooling of the pipes and nozzles in the combustor is provided during the pre-heat cycle (and any other time the nozzles are not flowing liquid during combustor operation) by air supplied by combustion blower 81 through pipe 41, through pipe 231 through automatically (or manually) controlled shut-off valves 232, through check valves 233 and into pipe and nozzle 236.

Solid waste material, such as rice hulls, sawsdust, wood chips, food processing solid waste, rubber, plastics, etc., but not limited thereto, are transported by some means to a solid waste receiver system 223. From the receiver system, the solid waste is transported by conveyor, pneumatically or by some other means to a mulcher 222 which breaks apart any clods or chunks that may have formed during storage. A combination mulcher/shredder feeds the material to the first stage solid waste blower 221 which conveys the solid waste pneumatically at a pressure of about 2 psig through conduit 27' to a velocity reducer/solid waste accumulator system in the form of a cyclone inertial separator 23 which removes some of the air used for pneumatic transport and returns the excess in a closed system back to hood enclosure 236 over mulcher 222 and also acts as a plenum or reservoir to smooth out the flow of solid waste prior to its entry into the combustor. The solid waste is delivered to blower 25 where the pneumatic feed pressure is boosted to approximately 4 psig for pneumatic transport through control valve 26', solid waste feed pipe 26 and injection into the fluid bed material 61. Air cooling is supplied through valve 234 and pipe 235 for cooling of the solid waste feed 26 during pre-heat cycle and any other time the solid waste system is not in use

EXAMPLE 2B

As another preferred embodiment and as previously discussed as optional water feed system can be provided to allow this embodiment or any other embodiment of the present invention to be used solely as a method and apparatus for disposal of solid waste in a pollution free manner. A water feed system 228 (FIG. 11) can be used in conjunction with or separate from the previously discussed liquid waste feed system. When used in conjunction with the liquid waste feed system, water is fed to the system through shut-off valve 229, through check valve 230, through flow switch or switches 227 and into pipe or pipes 105. From there on the water follows the same path and is controlled in the same manner as was previously discussed for the liquid waste feed and control system.

There may be a case with the present invention where either the heat value of the solid waste is too low to make the system self sustaining, or for some reason the solid waste feed may be interrupted. In either of these cases, an auxiliary fuel system 245 (FIG. 11) can be installed to allow continual operation of any embodiment of the present invention if desired.

The auxiliary fuel system consists of fuel guns 239 fed with oil (or any other liquid or gaseous fuel desired) delivered from oil tank 133 by oil pump 135 through pipe 246 to shut-off valve 237 to flow control valves 238. Air is used to cool the housing of the oil guns, to help atomize the oil and to purge the oil lines when the oil is shut off. Air is supplied through pipe 240, shut-off valve 241, check valves 242, cooling air valves 243 and atomizing and purge valves 244.

To expand further on the heretofore mentioned turbocharger sub-system that under certain conditions could improve upon the preferred embodiment or other embodiments of the present invention, FIG. 12 is includes to show schematically how the turbochargers would operate within the invention.

Referring now to FIG. 12, the turbine section 201 of turbocharger 200 (which consists of turbine section 201 and compressor section 202) is mounted to exhaust stack 76 of the inertial separator or other particle collection device 72. Exhaust gases from the combustor assembly 30 pass through the gas particle collectors 72, where they are cleaned of particulate, are then carried through exhaust pipe 76 to the turbine section 201.

The energy of the exhaust gases drive the turbine wheel and the spent exhaust gases then exit to the atmosphere through exhaust pipe 205. The turbine section 201, in turn, drives the compressor section 202 which receives ambient air through filter 206 and conduit 210. The compressed and now pre-heated air leaves the compressor section and is directed to the cooling port of the particle collector module through valve 207 and conduit 208, thence to airbox 32 to provide combustion air and fluidization to the combustor 30. A waste gate controller 204 and valve 203 are used to control the output of the turbocharger 200 by bypassing the exhaust gases around the turbine section 201.

The turbochargers will not operate until the combustor is operating, consequently other means must be used to pre-heat and initially fluidize the combustor. One way to accomplish this is to use a similar, but smaller, blower 81 to supply air required for the pre-heat cycle and to supply enough air to start fluidization. Once the system is pre-heated and fluidization has been started, the turbocharger system 200 can be brought into use to augment the blower 81 and as combustion increases provide more and more air until maximum allowable fluidization is reached. Blower 81 is isolated from the system during normal operation by closing valve 83.

The turbochargers can have more than enough capacity to supply all air needs of the present invention, such as bleed cooling air passing through pipe 91. By other design, excess turbocharger air could also be used to feed solid and liquid wastes and any other air powered systems.

The heat of the exhaust leaving the turbocharger has sufficient thermal energy remaining that it can be put to further use such as producing steam, used in drying cycles, etc.

By way of illustrative example, turbochargers, such as those made by TRW, Model TH08 of AiResearch Industrial Division of Garrett Corp., etc, can be used. One of numerous configurations would be the use of one or more AiResearch TH08 turbochargers attached to one or more of the exhaust stacks of the 5 foot outside diameter combustor of Example 2A above. To supply all the air necessary to operate the preferred industrail system, one TH08 turbocharger tied into all four exhaust stacks would supply all the combustion and cooling air required to operate the system at fluidizing air flow rates (superficial velocity) up to approximately 8 ft/sec. Two TH08 turbocharges would supply more than enough air to operate the system at maximum superficial velocity with energy to spare.

Figure 13:
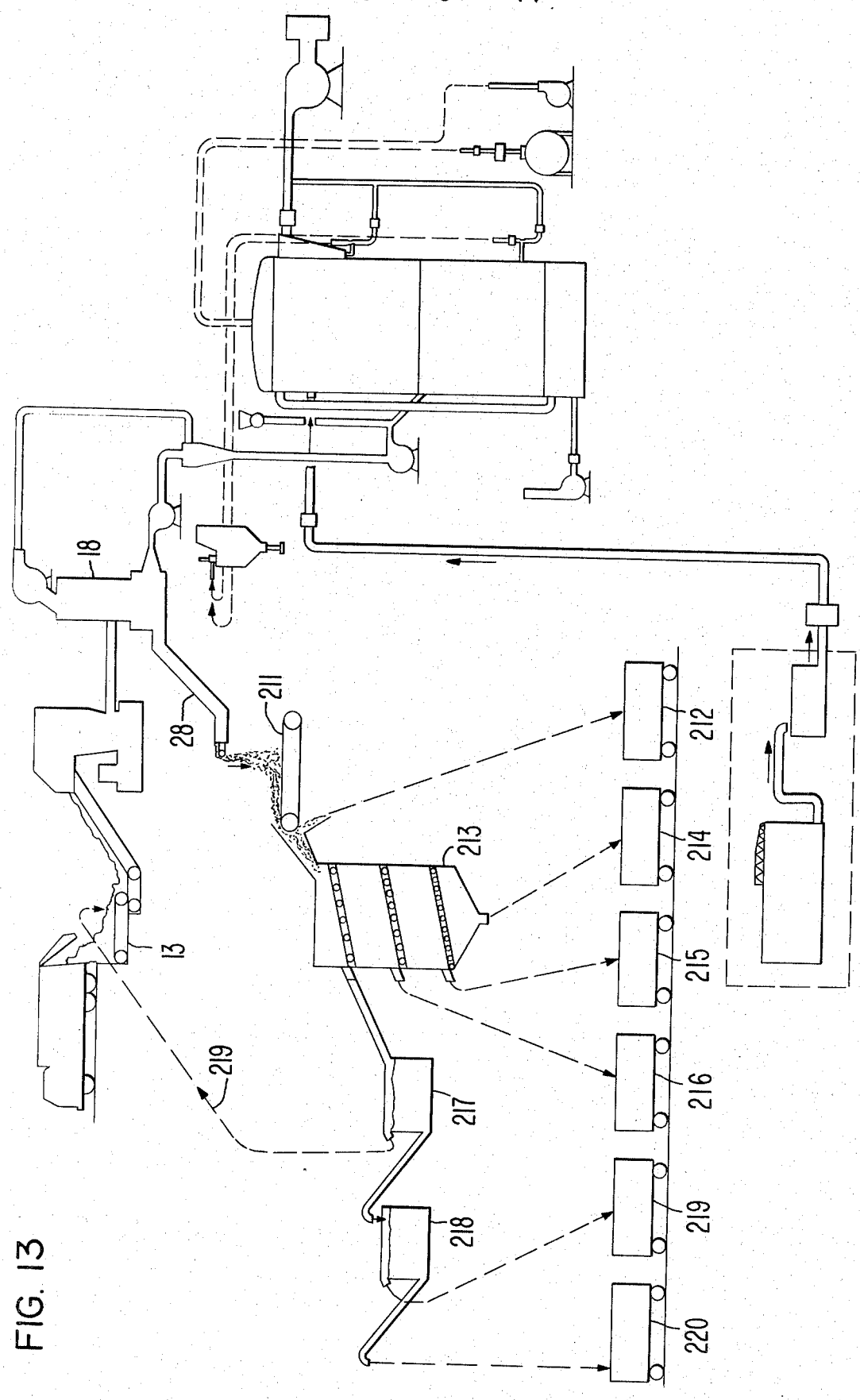
FIG. 13 is a schematic elevational view of a material recovery system of the present invention.

To expand further on another heretofore mentioned optional subsystem, FIG. 13 is a schematic diagram showing a material recovery system added to the present invention to receive reject material from the air classifier and separate it into usable and recyclable materials. A material recovery system could consist of any or all of the following components: Air classifier 18 separates the noncombustible material from the shredded solid waste. Conveyor 28 carries the reject material to a magnetic separator 211 where magnetic material (such as ferrous materials) is extracted and placed in storage device 212. The nonmagnetic material then passes onto vibrating screens 213 where glass, small bits of rock, etc., are separated into various sizes and placed in storage devices 214, 215 and 216. The remaining material is then carried to flotation devices or heavy media separators 217 and 218 where any inorganics or light combustible materials are separated and teturned to the receiving pit 13 via transport 219. The other material from the heavy media separators, such as aluminum, copper, zinc, etc., are placed in storage devices 219 and 220.

Figure 14:
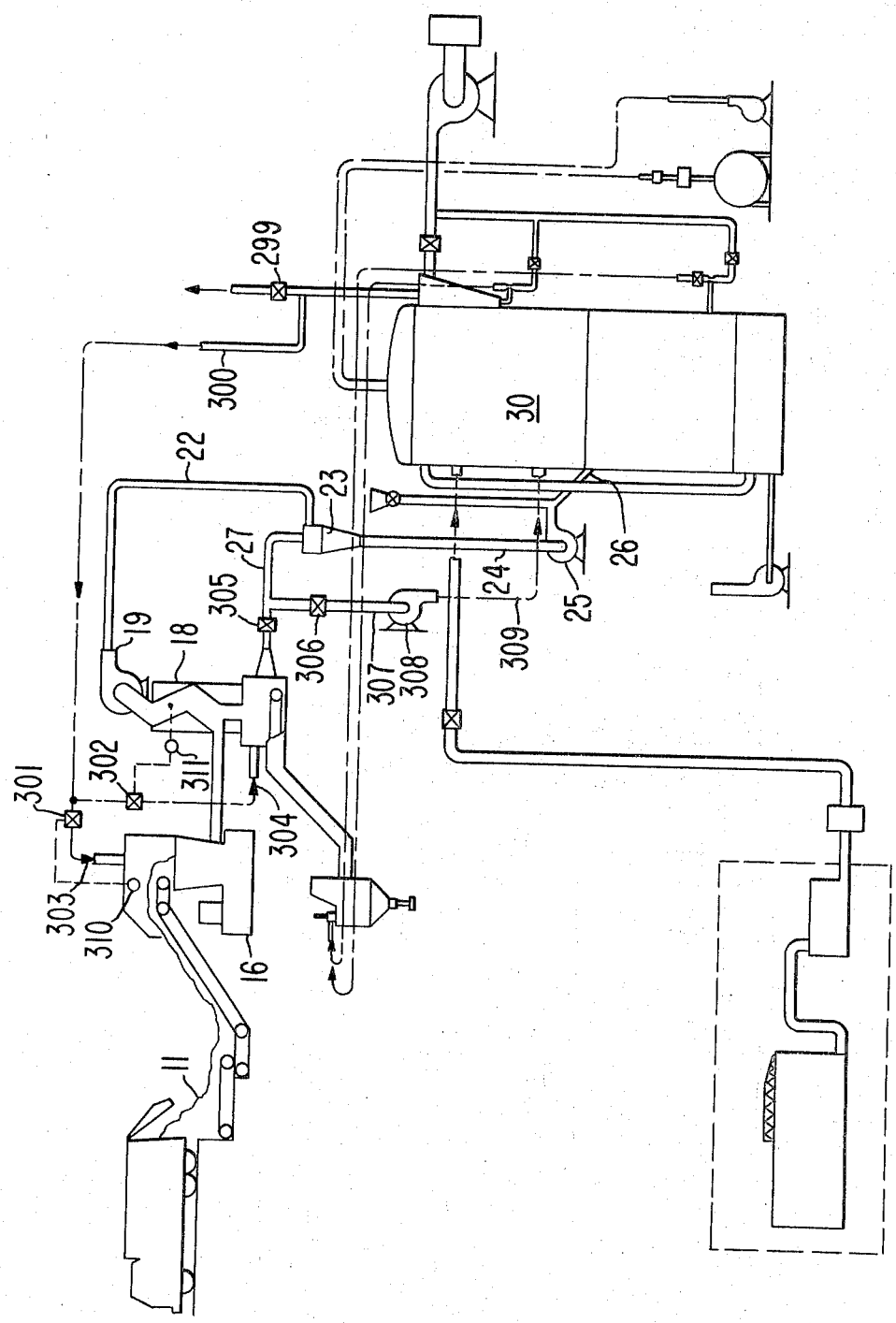
FIG. 14 is a schematic elevational view with an alternative solid waste drying system.

To expand further on another optional subsystem, FIG. 14 is a schematic diagram showing a solid waste drying system added to the present invention to provide a means of drying abnormally wet, solid waste material prior to injection into the combustion housing. In the drying system hot exhaust gases from exhaust stacks 76 are diverted by means of exhaust stack control valve 299 through conduit 300 to control valves 301 and 302. Some of the hot exhaust gases are directed through conduit 303 from valve 301 onto the top of shredder 16, mixing with and drying solid waste 11 as the solid waste enters the shredder. Temperature sensing means 310, modulates control valve 301 to maintain temperature within the top of shredder 16 at an appropriate level to provide for proper drying of solid waste 11 but not to exceed temperatures which are harmful to the operation of the shredder. Exhaust gases are also diverted from conduit 300 by valve 302 through conduit 304 into the plenum air box of air classifier 18. The hot exhaust gases cause drying of the air classifier reject material and also mix with the light combustible material passing through air classifier 18. Temperature sensing device 311 modulates the valve 302 to maintain the proper temperature within air classifier 18 so as to promote further drying of solid waste and not to exceed temperatures that would be harmful to the air classifier blower and other components downstream. The heated and dried solid waste along with the water vapor laden hot air passes through pipe 22 to cyclone inertial separator 23.

A large portion of the water vapor laden gases are removed from the solid waste stream by the cyclone inertial separator 23 and are transported through pipe 27 to control valves 305 and 306. The majority of the water vapor ladened hot gas is passed via valve 306 through conduit 307 to blower 308 where the pressure is boosted and is then injected into combustor assembly 30 through conduit 309. The water vapor laden hot gases are fed into the combustor assembly 30 above the secondary bed 36 so that the water vapor and noxious gases and odors contained in the drying gases are thermally consumed without affecting the operation of the primary fluid bed. Some of the water vapor laden exhaust gases may be directed back to the air plenum chamber of air classifier 18 through valve 305.

Figure 15:
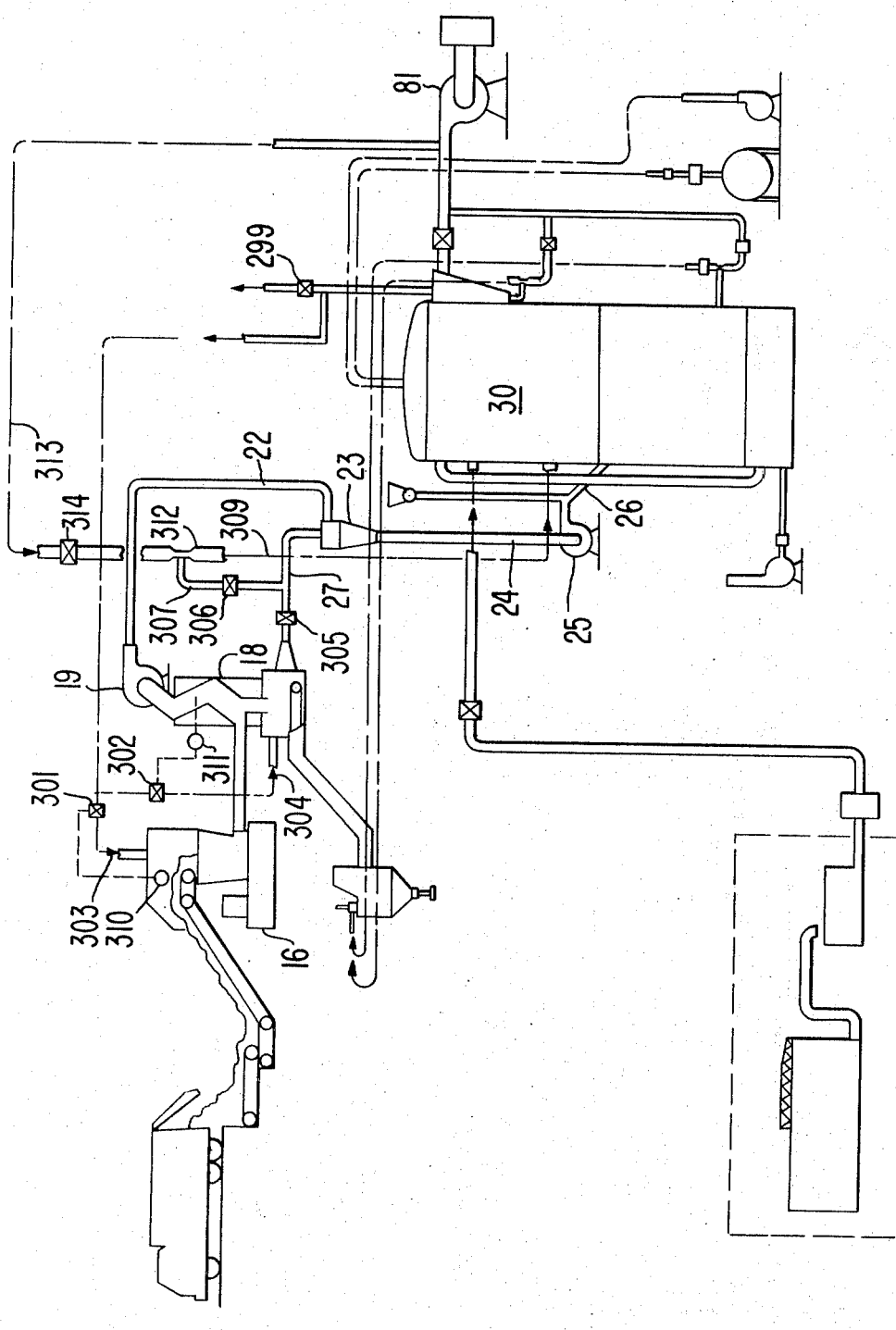
FIG. 15 is a schematic elevational view of the invention with an alternative feed apparatus.

An alternative to blower 308 would be the use of a pneumatic eductor 312 as shown schematically in FIG. 15. In this configuration, air from the system combustion air source 81 is directed through pipe 313 to valve 314. Valve 314 controls the amount of high pressure air from the system combustor air source 81 going to eductor 312. The water vapor laden hot gas extracted from the cyclone inertial separator 23 passes through valve 306 and conduit 307, is entrained by the eductor and is fed into the combustor assembly 30 through conduit 309.

For configurations of the present invention where said shredder 16 and said air classifier 18 are not required for proper processing and handling of the solid waste 11, a drying cycle similar to that described and shown schematically in FIG. 14 can be used with the system shown in FIG. 11 and diversion of the exhaust gases from exhaust stacks 76 through conduit 300 and through valve 301 (shown in FIG. 14) into the solid waste feed stream, upstream of mulcher 222 of FIG. 11. A temperature sensing device downstream of the mulcher would modulate valve 301 so the temperatures within the remaining portion of the solid waste feed system would be appropriate for drying the solid waste but controlled to a low enough temperature so as to not damage any of the components of the remaining portions of the system. The operation of the rest of the drying system would be similar to that previously described and shown in FIG. 14.

Figure 16:
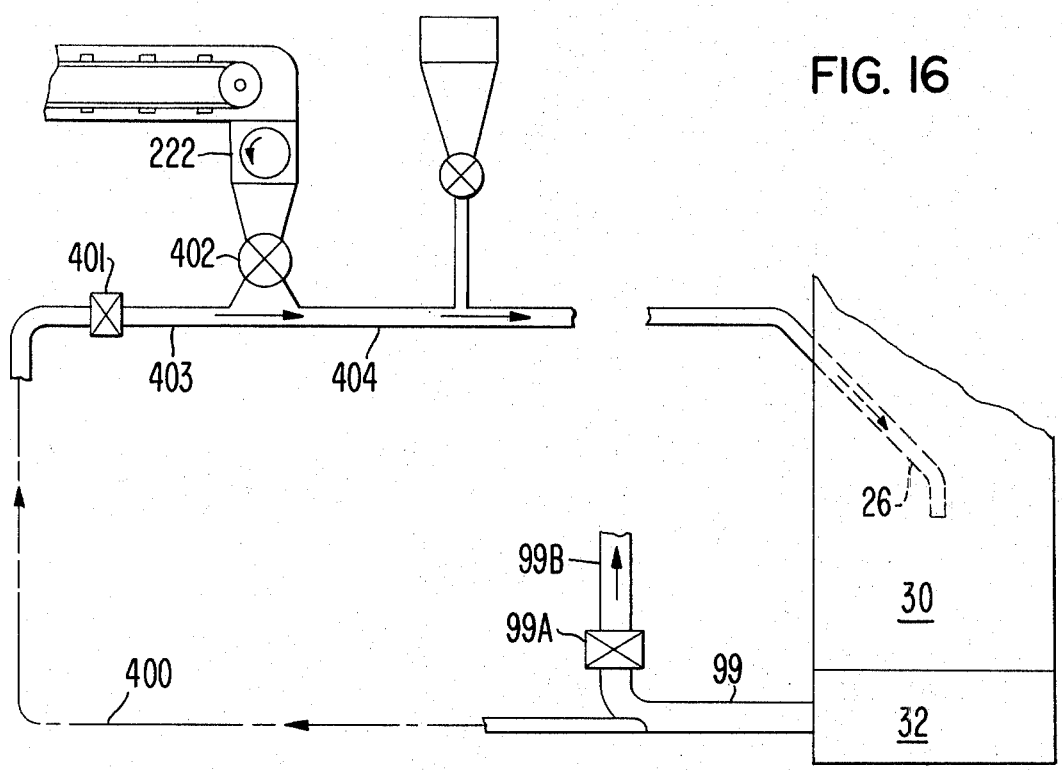
FIGS. 16 and 17 are schematic elevational views of other feed systems.
Figure 17:
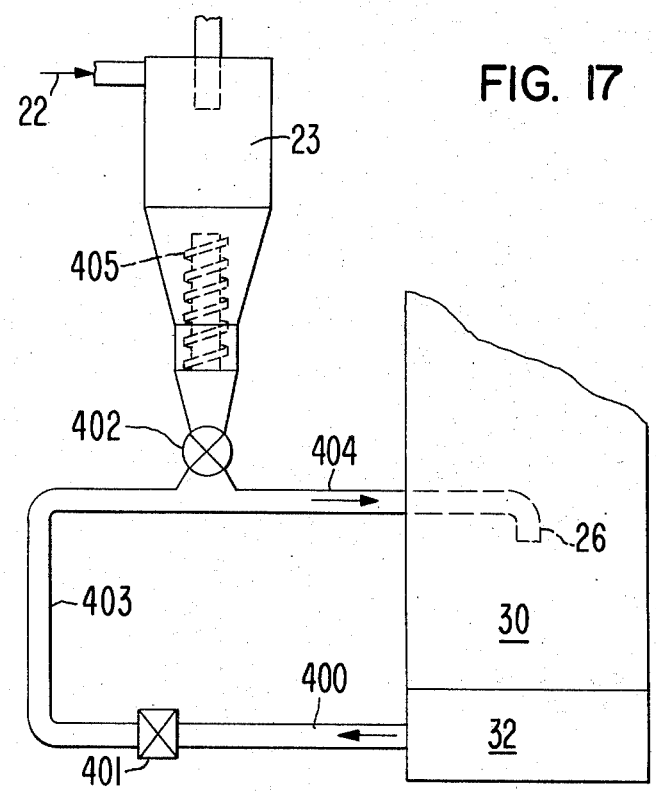

To expand further on still another optional sub-system, FIGS. 16 and 17 show two of many possible sub-systems that could be used as alternative methods for solid waste feed. FIG. 16 shows an air lock type feed valve 402 incorporated into the design taking the place of blower 19, cyclone inertial separator 23, and blower 25 used in the industrial system shown in FIG. 11. In the sub-system shown in FIG. 16, the solid waste would be directed from the mulcher 222 into the air lock type feed valve 402 where it would be pneumatically conveyed into combustor assembly 30 through conduit 404 and solid waste feed pipe 26. Air for the pneumatic conveying and to provide the proper pressure for injection into the combustor assembly 30, would be provided by the system combustion air source 51 and would be extracted from air box 32 through conduit 400 and controlled by valve 401.

FIG. 17 shows another configuration of an alternative solid waste feed system compatible with the present invention shown in FIG. 1. This system would be used where a shredder/air classifier sub-system is required for solid waste processing. The system shown in FIG. 17 would replace solid waste feed blower 25 and utilize the same air classifier blower 19 and cyclone inertial separator 23. A screw feed mechanism 405 would be installed downstream of the cyclone inertial separator 23 to provide a positive feed of the solid waste into air lock type feed valve 402. The solid waste would be pneumatically injected into combustor assembly 30 as described by the system in FIG. 16.

Previous discussions about the preferred embodiments of the present invention have defined in some cases only specifics about the method and apparatus. The intent of the present invention is that any of the apparatus defined can be of any size and shape, made of any suitable material and be fabricated and constructed in any appropriate way. Also, the intent of the present invention is that any of the methods defined can be performed and/or accomplished in any way, manner or fashion that will allow the system to properly operate.

We claim:

1. A waste disposal apparatus for consuming waste with minimal residue and substantially pollution free gaseous output including:
   a combustion housing,
   a bed of granular material,
   means for supporting said bed of granular material in said housing,
   means for providing combustion air to the bottom of said bed for maintaining said granular material in a fluidized state,
   an obstruction of labyrinth construction positioned in said housing above said bed,
   means for introducing waste combustible material into said housing below said obstruction,
   means for introducing waste liquid other than said combustible material into said housing below said obstruction, and
   means for controlling combustion conditions in said housing to consume said waste material.

2. A waste disposal apparatus for consuming waste with minimal residue and substantially pollution free gaseous output including:
   a combustion housing,
   a bed of granular material,
   means for supporting said bed of granular material,
   means for providing combustion air to the bottom of said bed for maintaining said granular material in a fluidized state,
   means for introducing waste combustible material into said housing,
   means for introducing waste liquid other than said combustible material into said housing,
   means for controlling combustion conditions in said housing to consume said waste material,
   means for determining the temperature within said combustion housing, and
   means responsive to said temperature determining means for feeding said liquid waste at a rate to maintain the temperature within said combustion housing at a desired level.

3. A waste disposal apparatus for consuming waste with minimal residue and substantially pollution free gaseous output including:
   a combustion housing,
   a bed of granular material,
   means for supporting said bed of granular material,
   means for providing combustion air to the bottom of said bed for maintaining said granular material in a fluidized state,
   means for introducing waste combustible material into said housing,
   means for introducing waste liquid other than said combustible material into said housing,
   means for controlling combustion conditions in said housing to consume said waste material,
   means for determining the content of combustion gases from said combustion housing, and
   means responsive to said content determining means for feeding said waste combustible material at a rate to maintain the desired balance of oxygen-to-combustibles in said combustion housing.

4. A waste disposal apparatus for consuming waste with minimal residue and substantially pollution free gaseous output including:
   a combustion housing,
   a bed of granular material,
   means for supporting said bed of granular material,
   means for providing combustion air to the bottom of said bed for maintaining said granular material in a fluidized state,
   means for introducing waste combustible material into said housing,
   means for introducing waste liquid other than said combustible material into said housing,
   means for controlling combustion conditions in said housing to consume said waste material,
   means for determining the temperature within said combustion housing, means responsive to said temperature determining means for feeding said liquid waste at a rate to maintain the temperature within said housing at a desired level, means for determining the content of combustion gases from said housing, and means responsive to said content determining means for feeding said waste combustible material at a rate to maintain the desired balance of oxygen-to-combustibles in said housing.

5. A waste disposal apparatus for consuming waste with minimal residue and substantially pollution free gaseous output including:

a combustion housing, a bed of granular material, means for supporting said bed of granular material, means for providing combustion air to the bottom of said bed for maintaining said granular material in a fluidized state, means for introducing waste combustible material into said housing, means for introducing waste liquid other than said combustible material into said housing, means for controlling combustion conditions in said housing to consume said waste material, and means for pneumatically feeding said waste combustible material into the said combustion housing comprising at least first and second stage blowers to provide air flow and pressure and a velocity reducer waste accumulator located between said blowers to smooth out the flow of combustible waste and to return excess air to the first stage blower.

6. The waste disposal apparatus of claim 4 including means for pneumatically feeding said waste combustible material into the said combustion housing comprising at least first and second stage blowers to provide air flow and pressure and a velocity reducer waste accumulator located between said blowers to smooth out the flow of combustible waste and to return excess air to the first stage blower.

7. The waste disposal apparatus of claim 4 including means for shredding combustible solid waste material.

8. The waste disposal apparatus of claim 1 including means for separating heavy non-combustible material from the combustible waste material.

9. The waste disposal apparatus of claim 5 including means for separating heavy non-combustible material from the combustible waste material by air classification at said first stage blower.

10. The waste disposal apparatus of claim 1 including means for mulching solid chunks of the said combustible waste material.

11. The waste disposal apparatus of claim 1 including means for drying with combustion exhaust gases said combustible waste prior to injection into the said combustion housing and means for directing water vapor laded hot gases from said drying means to said combustion housing.

12. The waste disposal apparatus of claim 1 including means for adding pollution suppressant material into the said combustion housing.

13. A waste disposal apparatus for consuming waste with minimal residue and substantially pollution free gaseous output including:

a combustion housing, a bed of granular material, means for supporting said bed of granular material, means for providing combustion air to the bottom of said bed for maintaining said granular material in a fluidized state, means for introducing waste combustible material into said housing, means for introducing waste liquid other than said combustible material into said housing, means for controlling combustion conditions in said housing to consume said waste material, means for adding pollution suppressant material into the said combustion housing, means for determining the amount of constituents of the combustion exhaust gases and means for controlling said pollution suppressant material adding means to maintain acceptable constituent levels.

14. The waste disposal apparatus of claim 1 including means attached to said combustion housing for separating particles from the gaseous combustion products.

15. A waste disposal apparatus for consuming waste with minimal residue and substantially pollution free gaseous output including:

a combustion housing, a bed of granular material, means for supporting said bed of granular material, means for providing combustion air to the bottom of said bed for maintaining said granular material in a fluidized state, means for introducing waste combustible material into said housing, means for introducing waste liquid other than said combustible material into said housing, means for controlling combustion conditions in said housing to consume said waste material, and means attached to said combustion housing for separating particles from the gaseous combustion products, said particle separating means including a plurality of single stage inertial separators and means for housing and cooling said separators.

16. A waste disposal apparatus for consuming waste with minimal residue and substantially pollution free gaseous output including:

a combustion housing, a bed of granular material, means for supporting said bed of granular material, means for providing combustion air to the bottom of said bed for maintaining said granular material in a fluidized state, means for introducing waste combustible material into said housing, means for introducing waste liquid other than said combustible material into said housing, means for controlling combustion conditions in said housing to consume said waste material, means for separating heavy non-combustible material from the combustible waste material, a plurality of single stage inertial separators for separating particles from the gaseous combustion products and means for removing and storing in a closed collection housing particles separated by said inertial separators and said separating means.

17. The waste material disposal apparatus of claim 1 including turbocharger means connected in communication with and driven by the exhaust gases from said housing and supplying air for operation of the apparatus.

18. The waste material disposal apparatus of claim 8 including means for separating recyclable material from the said separated non-combustible material.

19. The waste disposal apparatus of claim 1 wherein said housing includes a plurality of segmented sections joined together at the installation site.

20. The waste disposal apparatus of claim 1 including air lock feeder valve means for feeding said combustible waste into said combustion housing.

21. The waste disposal apparatus of claim 1 including screw feed means for feeding said solid waste into said combustion housing by use of a screw type feed device.

22. The waste disposal apparatus of claim 1 including reverse flow pre-heating means for pre-heating said combustion housing.

23. The waste disposal apparatus of claim 1 wherein the said means for supporting said granular material includes a plurality of plates made of porous material incased with and supported by structure of other material.

24. The waste disposal apparatus of claim 1 wherein the said means for supporting said granular material includes a plurality of nozzles at least in part made of porous material and means supporting said nozzles.

25. The waste disposal apparatus of claim 1 including a secondary bed of particles positioned in said combustion housing above said bed.

26. The waste disposal apparatus of claim 25 including means for returning to the first bed, particles of said first bed which are carried to said secondary bed.

27. The waste disposal apparatus of claim 25 including means for internally cooling said secondary bed.

28. The waste disposal apparatus of claim 25 wherein said secondary bed includes a pair of spaced apart perforated plates and between said plates a multitude of particles larger in size than the particles of the first bed.

29. The waste disposal apparatus of claim 28 wherein said plates are positioned in said combustion housing at a slight angle with respect to a horizontal plane.

30. The waste disposal apparatus of claim 1 including means of determining and maintaining the depth of said bed to a desired level.

31. The waste disposal apparatus of claim 30 including means for automatic removal and closed storage of portions of said bed.

32. A waste material disposal apparatus where water is used as a coolant to control disposal by combustion of solid, combustible waste with minimum residue and substantially pollution-free gaseous output including:
a combustion housing,
a bed of granular material,
means for supporting said bed of granular material,
means for introducing combustion air to the bottom of said bed for maintaining said granular material in a fluidized state,
means for preparing and introducing solid, combustible materials into said bed,
means for preparing and introducing waste liquid into the said combustion housing,
means for controlling combustion conditions in said combustion housing to consume said waste material including;
means for determining the temperature within the combustion housing,
means responsive to said temperature determining means for feeding said liquid waste at a rate to maintain the temperature in said housing at a desired level,
means for determining the content of combustion gases from said combustion housing,
means responsive to said content determination means for feeding said solid combustion material at a rate to maintain the desired balance of oxygen-to-combustibles in said combustion housing, and
means for removing, collecting and storing residue remaining from said waste material after combustion in said combustor housing.

33. The waste disposal apparatus of claim 32 including means for pneumatically feeding said waste combustible material into the said combustion housing comprising at least first and second stage blowers to provide air flow and pressure and a velocity reducer waste accumulator located between said blowers to smooth out the flow of combustible waste and to return excess air to the first stage blower.

34. The waste disposal apparatus of claim 32 including means for shredding combustible solid waste material.

35. The waste disposal apparatus of claim 32 including means for separating heavy non-combustible material fron the combustible waste material.

36. The waste disposal apparatus of claim 33 including means for separating heavy non-combustible material from the combustible waste material by air classification at said first stage blower.

37. The waste disposal apparatus of claim 32 including means for mulching solid chunks of the said combustible waste material.

38. The waste disposal apparatus of claim 32 including means for drying with combustion exhaust gases said combustible waste prior to injection into the said combustion housing and means for directing water vapor laden hot gases from said drying means to said combustion housing.

39. The waste disposal apparatus of claim 32 including means for adding pollution suppressant material into the said combustion housing.

40. The waste disposal apparatus of claim 39 including means for determining the amount of constituents of the combustion exhaust gases and means for controlling said pollution suppressant material adding means to maintain acceptable constituent levels.

41. The waste disposal apparatus of claim 32 including means attached to said combustion housing for separating particles from the gaseous combustion products.

42. The waste disposal apparatus of claim 41 wherein said particle separating means includes a plurality of single stage inertial separators and means for housing and cooling said separators.

43. The waste disposal apparatus of claim 35 including a plurality of single stage inertial separator for separating particles from the gaseous combustion products and means for removing and storing in a closed collection housing particles separated by said inertial separators and said separating means.

44. The waste material disposal apparatus of claim 32 including turbocharger means connected in communication with and driven by the exhaust gases from said housing and supplying air for operation of the apparatus.

45. The waste material disposal apparatus of claim 35 including means for separating recyclable material from the said separated non-combustible material.

46. The waste disposal apparatus of claim 32 wherein said housing includes a plurality of segmented sections joined together at the installation site.

47. The waste disposal apparatus of claim 32 including air lock feeder valve means for feeding said combustible waste into said combustion housing.

48. The waste disposal apparatus of claim 32 including screw feed means for feeding said solid waste into said combustion housing by use of a screw type feed device.

49. The waste disposal apparatus of claim 32 including reverse flow pre-heating means for pre-heating said combustion housing.

50. The waste disposal apparatus of claim 32 wherein the said means for supporting said granular material includes a plurality of plates made of porous material incased with and supported by structure of other material.

51. The waste disposal apparatus of claim 32 wherein the said means for supporting said granular material includes a plurality of nozzles at least in part made of porous material and means supporting said nozzles.

52. The waste disposal apparatus of claim 32 including a secondary bed of particles positioned in said combustion housing above said bed.

53. The waste disposal apparatus of claim 52 including means for returning to the first bed, particles of said first bed which are carried to said secondary bed.

54. The waste disposal apparatus of claim 52 including means for internally cooling said secondary bed.

55. The waste disposal apparatus of claim 52 wherein said secondary bed includes a pair of spaced apart perforated plates and between said plates a multitude of particles larger in size than the particles of the first bed.

56. The waste disposal apparatus of claim 55 wherein said plates are positioned in said combustion housing at a slight angle with respect to a horizontal plane.

57. The waste disposal apparatus of claim 32 including means of determining and maintaining the depth of said bed to a desired level.

58. The waste disposal apparatus of claim 57 including means for automatic removal and closed storage of portions of said bed.

59. In a fluid bed reactor assembly wherein a bed of granular materials is fluidized to react with other material introduced therein, the improvement comprising:
a housing,
a first bed of granular material,
means for supporting said bed of granular material in said housing,
means for providing a fluidized medium to the bottom of said bed for maintaining said granular material in a fluidized state, and
an obstruction of labyrinth construction positioned in said housing above said first bed.

60. The apparatus in accordance with claim 59 including means for internally cooling said labyrinth obstruction.

61. The apparatus in accordance with claim 59 wherein
said labyrinth obstruction includes a pair of spaced apart perforated plates, and
a multitude of particles positioned between said plates larger in size than the particles of said first bed.

62. The apparatus of claim 61 wherein said plates are positioned in said combustion housing at a slight angle with respect to a horizontal plane.

63. The apparatus of claim 59 including means for returning to said first bed particles of said first bed which are carried through said labyrinth obstruction 64. The method of waste disposal comprising
fluidizing a bed of granular material having heat storing and heat radiating capability with combustion air for combustion of waste material,
simultaneously introducing solid waste and liquid waste into said fluidized bed, for combustion therein,
automatically controlling the rate of introduction of said liquid waste into said bed to maintain the combustion temperature within a desired range, and
automatically controlling the introduction of said solid waste into said bed to maintain the relation of oxygen-to-combustibles in the bed within a desired range.

65. The method of claim 64 including adding air pollution suppressents to said bed to maintain constituent levels in the combustion exhaust gases within a desired range.

66. The method of claim 64 including collecting separate from atmosphere non-combustibles from the solid waste before introduction into the fluid bed and particulate matter separated from the combustion exhaust gases.

67. The method of claim 64 including passing the combustion gases from the fluidized bed through a second bed of granular materials larger in size than the particles in the first fluidized bed.

68. The apparatus of claim 1 including means for removing, collecting and storing residue remaining from said waste material after combustion in said combustion housing.

* * * * *